(12) United States Patent
Sabe et al.

(10) Patent No.: US 10,436,591 B2
(45) Date of Patent: Oct. 8, 2019

(54) POSITION ESTIMATION DEVICE AND POSITION ESTIMATION METHOD

(71) Applicant: SONY CORPORATION, Tokyo (JP)

(72) Inventors: Kohtaro Sabe, Tokyo (JP); Haruto Takeda, Tokyo (JP); Peter Duerr, Tokyo (JP); Satoru Shimizu, Tokyo (JP); Tsutomu Sawada, Tokyo (JP); Kousuke Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/236,749

(22) Filed: Dec. 31, 2018

(65) Prior Publication Data

US 2019/0137274 A1    May 9, 2019

Related U.S. Application Data

(63) Continuation of application No. 15/512,837, filed as application No. PCT/JP2015/076315 on Sep. 16, 2015, now Pat. No. 10,203,208.

(30) Foreign Application Priority Data

Oct. 17, 2014    (JP) .................. 2014-212311

(51) Int. Cl.
  *G01C 21/16*    (2006.01)
  *G01C 21/18*    (2006.01)
  *G01S 19/49*    (2010.01)
  *G01S 19/47*    (2010.01)
  *G05D 1/10*    (2006.01)

(52) U.S. Cl.
  CPC .......... *G01C 21/165* (2013.01); *G01C 21/18* (2013.01); *G01S 19/47* (2013.01); *G01S 19/49* (2013.01); *G05D 1/101* (2013.01); *G05D 1/102* (2013.01)

(58) Field of Classification Search
  CPC ....... G01C 21/165; G01C 21/18; G01S 19/47; G01S 19/49; G05D 1/102; G05D 1/101
  See application file for complete search history.

(56) References Cited

U.S. PATENT DOCUMENTS

| 4,168,524 | A  | 9/1979 | Soltz et al. |
| 8,112,188 | B2 | 2/2012 | Rouquette et al. |
| 9,060,250 | B2 | 6/2015 | Alpert et al. |

(Continued)

FOREIGN PATENT DOCUMENTS

| CN | 102054164 A | 5/2011 |
| CN | 104205961 A | 12/2014 |

(Continued)

OTHER PUBLICATIONS

Notice of Allowance and Fees Due for U.S. Appl. No. 15/512,837, dated Sep. 26, 2018, 07 pages.

(Continued)

*Primary Examiner* — Russell Frejd
(74) *Attorney, Agent, or Firm* — Chip Law Group

(57) ABSTRACT

Provided is a device including: an acquisition unit that acquires information indicating a position estimation system selected from among a plurality of position estimation systems for estimating a position of a flight vehicle; and a position estimation unit that estimates the position of the flight vehicle from first information generated by using an inertial sensor of the flight vehicle and second information generated through the position estimation system based on a parameter for the position estimation system.

13 Claims, 18 Drawing Sheets

(56) References Cited

U.S. PATENT DOCUMENTS

| | | |
|---|---|---|
| 2008/0119970 A1 | 5/2008 | Campbell et al. |
| 2008/0294306 A1 | 11/2008 | Huynh et al. |
| 2010/0007550 A1 | 1/2010 | Nagamiya et al. |
| 2011/0096093 A1 | 4/2011 | Oi et al. |

FOREIGN PATENT DOCUMENTS

| | | |
|---|---|---|
| DE | 102009027503 A1 | 3/2010 |
| EP | 2835019 A1 | 2/2015 |
| JP | 2008-232869 A | 10/2008 |
| JP | 2010-019703 A | 1/2010 |
| JP | 2011-095797 A | 5/2011 |
| JP | 2012-177564 A | 9/2012 |
| JP | 2013-205278 A | 10/2013 |
| JP | 2014-174040 A | 9/2014 |
| JP | 2014-174070 A | 9/2014 |
| JP | 2015-519540 A | 7/2015 |
| KR | 10-2014-0138795 A | 12/2014 |
| WO | 2013/147822 A1 | 10/2013 |

OTHER PUBLICATIONS

Non-Final Rejection for U.S. Appl. No. 15/512,837, dated Apr. 27, 2018, 16 pages.

International Search Report and Written Opinion of PCT Application No. PCT/s.

International Preliminary Report on Patentability of PCT Application No. PCT/JP2015/076315, dated Apr. 27, 2017, 08 pages of English Translation and 05 pages of IPRP.

Office Action for JP Patent Application No. 2016-554022, dated Jun. 11, 2019, 5 pages of Office Action and 4 pages of English Translation.

FIG. 4
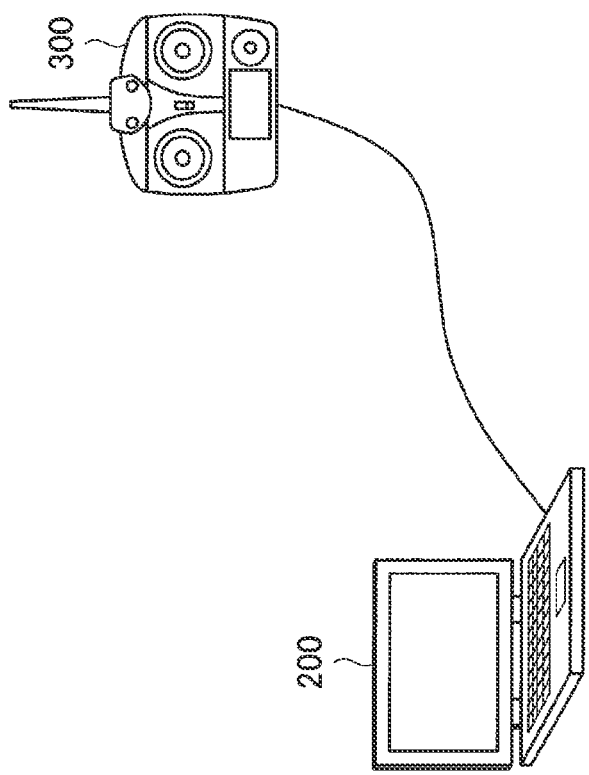
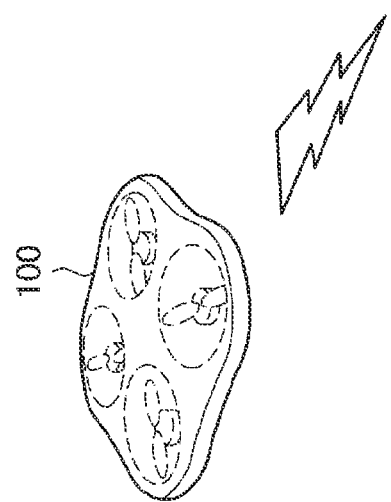

FIG. 10

| POSITION ESTIMATION SYSTEM | GPS (RTK-GPS) | MONOCULAR SLAM | STEREO SLAM | MARKER DETECTION | MOTION CAPTURING | BAROMETER |
|---|---|---|---|---|---|---|
| PRECISION | 5~10 m (2~5 cm) | SEVERAL cm ~ | SEVERAL cm ~ | SEVERAL TENS OF cm ~ | SEVERAL mm | SEVERAL TENS OF cm |
| CYCLE | 2~5 Hz (2~10 Hz) | 30 Hz | 30 Hz | 15 Hz | 100Hz | 50 Hz |
| TIME DELAY | 400~600ms | 30~100 ms | 60~100 ms | 60 ms ~ | 10[ms] | 20ms |
| FILTER TIME CONSTANT | 2.5 s | 1.5 s | 1.5 s | 2.5 s | 0.5 s | 2.5 s |
| USE ENVIRONMENT | OUTDOOR SPACE | INDOOR SPACE/ OUTDOOR SPACE | INDOOR SPACE/ OUTDOOR SPACE | INDOOR SPACE/ OUTDOOR SPACE (POOR) | INDOOR SPACE | INDOOR SPACE/ OUTDOOR SPACE |
| COMPATIBILITY WITH INERTIAL SENSOR | EXCELLENT | GOOD | POOR | EXCELLENT | GOOD | EXCELLENT |

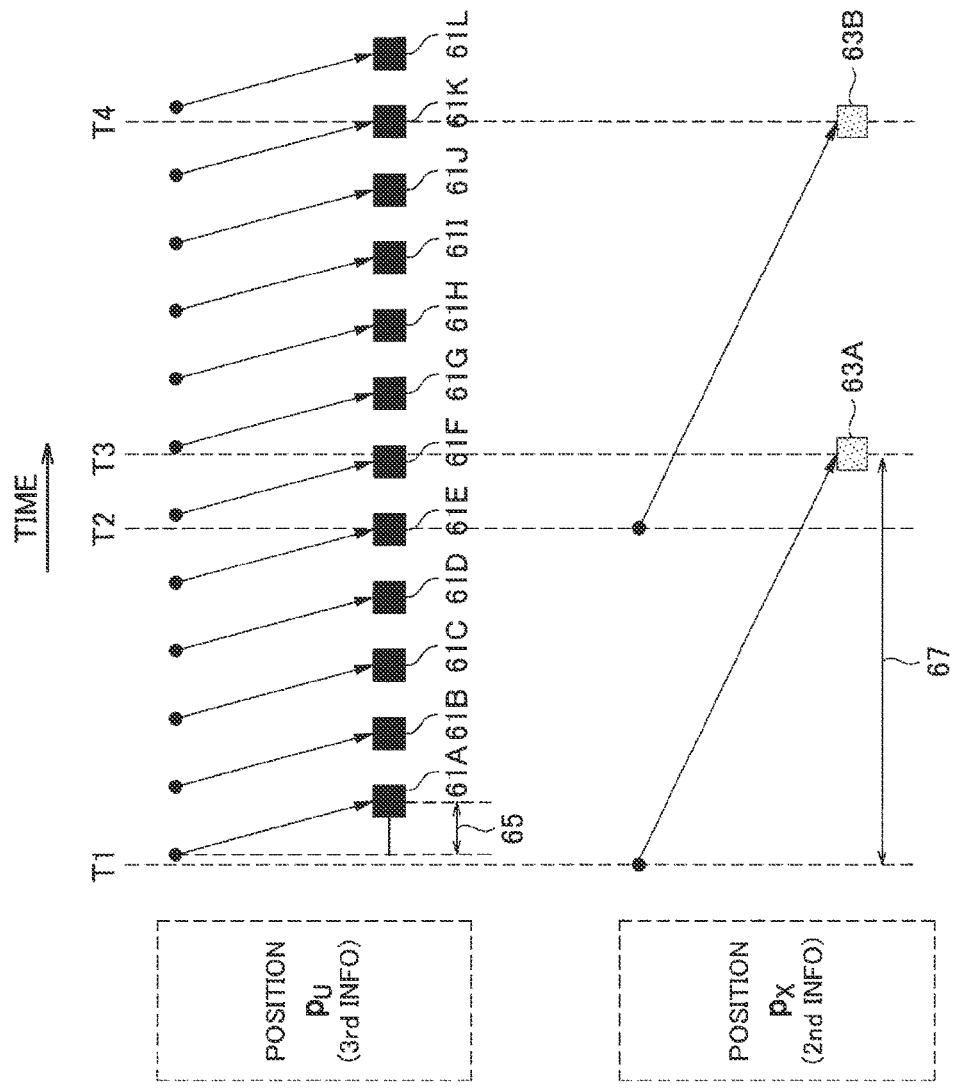

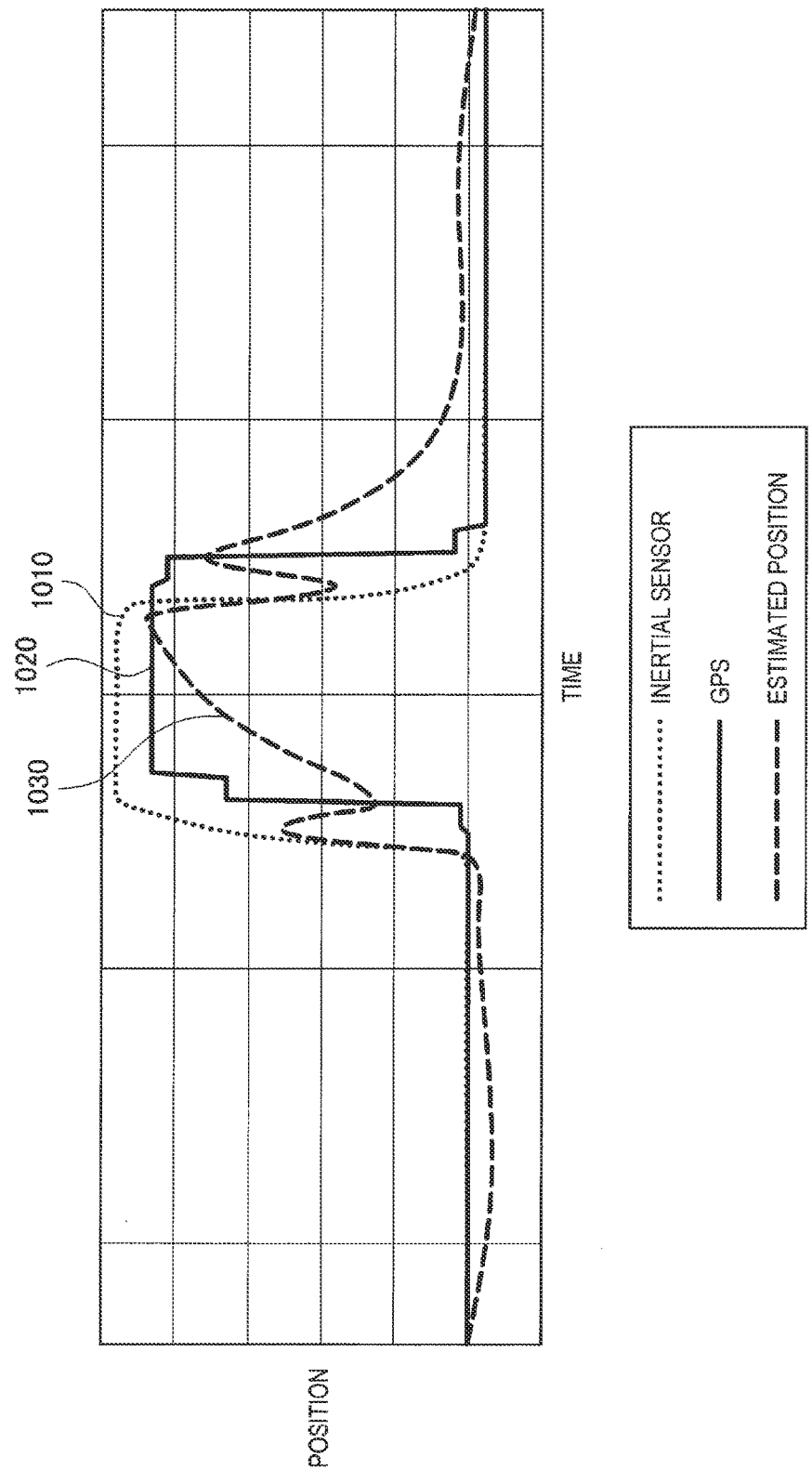

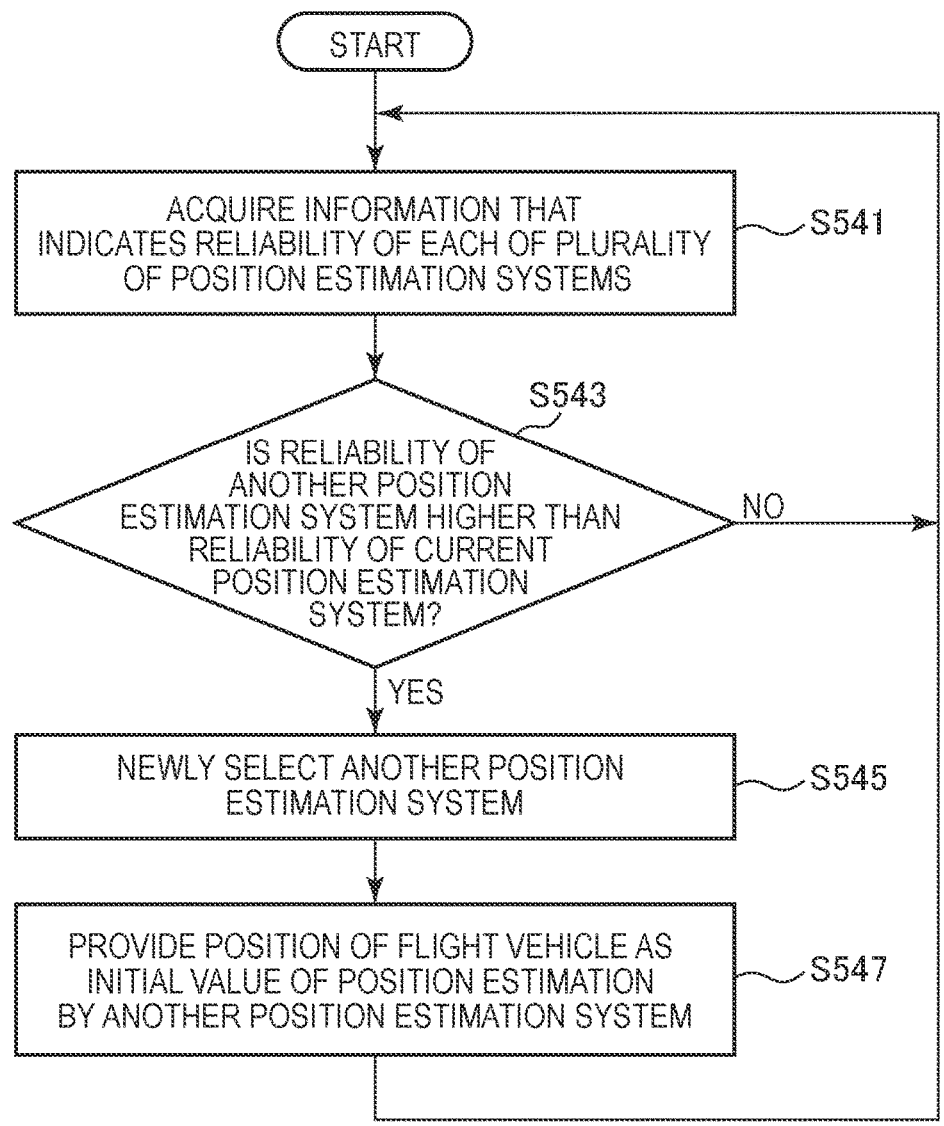

POSITION ESTIMATION DEVICE AND POSITION ESTIMATION METHOD

CROSS REFERENCE TO RELATED APPLICATIONS

The present application is a continuation application of U.S. patent application Ser. No. 15/512,837, filed on Mar. 20, 2017, now U.S. Pat. No. 10,203,208, which is a National Stage Entry of Patent Application No. PCT/JP2015/076315 filed on Sep. 16, 2015, which claims priority from prior Japanese Patent Application JP 2014-212311 filed in the Japan Patent Office on Oct. 17, 2014, the entire contents of which are hereby incorporated by reference.

TECHNICAL FIELD

The present disclosure relates to a device, a method, and a program.

BACKGROUND ART

For passenger planes, functions including automatic flight have been realized by posture estimation, position estimation, and the like using a combination of a highly precise inertial sensor and a GPS (Global Positioning System) receiver. In recent years, decreases in the size and the cost of inertial sensors have advanced, and as a result, an inertial sensor and a GPS receiver have been mounted even on small flight vehicles to perform position estimation, posture estimation, and the like.

For example, Patent Literature 1 discloses a technology of determining a rest state of a moving body by using a combination of a GPS receiver and an inertial sensor.

CITATION LIST

Patent Literature

Patent Literature 1: JP 2008-232869A

DISCLOSURE OF INVENTION

Technical Problem

However, such small flight vehicles may fly in locations where it is difficult to perform position estimation by using the GPS receiver unlike passenger planes. Since the inertial sensor in small flight vehicles generally exhibits low precision, the position of each flight vehicle is not appropriately estimated if it becomes difficult to perform position estimation by using the GPS receiver. As a result, it may not be possible to cause the flight vehicles to fly as desired.

Thus, it is desirable to provide a mechanism that makes it possible to more favorably estimate the position of a flight vehicle.

Solution to Problem

According to the present disclosure, there is provided a device including: an acquisition unit that acquires information indicating a position estimation system selected from among a plurality of position estimation systems for estimating a position of a flight vehicle; and a position estimation unit that estimates the position of the flight vehicle from first information generated by using an inertial sensor of the flight vehicle and second information generated through the position estimation system based on a parameter for the position estimation system.

In addition, according to the present disclosure, there is provided a method including causing a processor to acquire information that indicates a position estimation system selected from among a plurality of position estimation systems for estimating a position of a flight vehicle, and estimate the position of the flight vehicle from first information generated by using an inertial sensor of the flight vehicle and second information generated through the position estimation system based on a parameter for the position estimation system.

In addition, according to the present disclosure, there is provided a program that causes a processor to acquire information that indicates a position estimation system selected from among a plurality of position estimation systems for estimating a position of a flight vehicle, and estimate the position of the flight vehicle from first information generated by using an inertial sensor of the flight vehicle and second information generated through the position estimation system based on a parameter for the position estimation system.

Advantageous Effects of Invention

As described above, the present disclosure makes it possible to more favorably estimate the position of a flight vehicle. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is an explanatory diagram illustrating an example of an outline configuration of a system according to an embodiment of the present disclosure.

FIG. 10 is an explanatory diagram for explaining features of each position estimation system.

FIG. 11 is an explanatory diagram for explaining an example of position estimation based on a time delay parameter.

FIG. 12 is an explanatory diagram for explaining an example of a result of position estimation without using the time delay parameter.

FIG. 19 is a flowchart illustrating an example of an outline flow of second selection processing according to the embodiment.

MODE(S) FOR CARRYING OUT THE INVENTION

Figure 1:
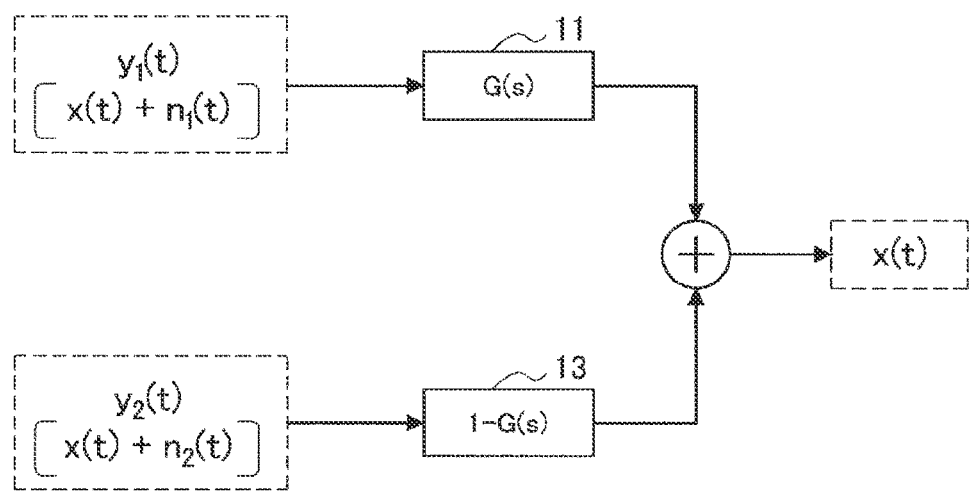
FIG. 1 is an explanatory diagram for explaining a first example of posture estimation using a combination of a gyro sensor and an acceleration sensor.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In the specification and the drawings, different letters will be added after the same reference numerals for discriminating between elements with substantially the same functional configurations in some cases. For example, a plurality of elements with substantially the same functional configurations will be discriminated between motors 120A, 120B, and 120C as needed. However, if it is not particularly necessary to discriminate between each of a plurality of elements with substantially the same functional configurations, only a common reference numeral will be added. For example, the motors 120A, 120B, and 120C will simply be referred to as a motor 120 if it is not particularly necessary to discriminate between the motors 120A, 120B, and 120C.

The following description will be given in the following order.
1. Basic posture estimation and position estimation
2. Outline configuration of system
3. Configuration of flight vehicle
4. Position estimation according to embodiment
5. Flow of processing
6. Conclusion

1. BASIC POSTURE ESTIMATION AND POSITION ESTIMATION

First, an example of basic posture estimation and position estimation will be described with reference to FIGS. 1 to 3.

(1) Inertial Sensor

For example, an inertial sensor of a flight vehicle can include a gyro sensor (or an angular velocity sensor) that detects an angular velocity of the flight vehicle and an acceleration sensor that measures acceleration of the flight vehicle. The inertial sensor can further include a digital compass (or a geomagnetic sensor).

(2) Posture Estimation (a) Estimation from Angular Velocity

For example, a variation in the posture of the flight vehicle is calculated by integrating the angular velocity that is detected by the gyro sensor. Therefore, the posture of the flight vehicle is calculated from an initial value of the posture of the flight vehicle and the variation in the posture of the flight vehicle.

The angular velocity that is detected by the gyro sensor has a drift property of a slow variation over time while exhibiting high reliability in a short period of time. Therefore, errors in the posture are accumulated over time in a case of calculating the posture only from the angular velocity (and the initial value) detected by the gyro sensor.

(b) Estimation from Acceleration

On the assumption that the flight vehicle has hovered and has not moved, for example, the posture of the flight vehicle can be calculated from a gravity direction detected by the acceleration sensor.

The acceleration detected by the acceleration sensor includes high-frequency noise due to influences of vibration and the like. However, since the gravity direction is always the same regardless of time, the acceleration sensor has high reliability over a long period of time.

(c) Sensor Fusion

Configuring a complementary filter by using the properties of the gyro sensor and the properties of the acceleration sensor as described above makes it possible to calculate the posture with high reliability. Such a combination of a plurality of sensors can be referred to as sensor fusion. Hereinafter, a condition example will be described with reference to FIGS. 1 and 2.

FIG. 1 is an explanatory diagram for illustrating a first example of posture estimation using a combination of the gyro sensor and the acceleration sensor. Referring to FIG. 1, posture $y_1(t)$ is calculated from the acceleration that is detected by the acceleration sensor, and posture $y_2(t)$ is calculated from the angular velocity that is detected by the gyro sensor. $y_1(t)$ is represented by $x(t)+n_1(t)$, and $y_2(t)$ is represented by $x(t)+n_2(t)$. $x(t)$ is an actual posture of the flight vehicle, $n_1(t)$ is high-frequency noise due to the acceleration sensor, and $n_2(t)$ is low-frequency noise due to the gyro sensor. Since the posture $y_1(t)$ includes the high-frequency noise $n_1(t)$, the high-frequency noise $n_1(t)$ is cut from the posture $y_1(t)$ by causing the posture $y_1(t)$ to pass through a low pass filter 11. In contrast, since the posture $y_2(t)$ includes the low-frequency noise $n_2(t)$, the low-frequency noise $n_2(t)$ is cut from the posture $y_2(t)$ by causing the posture $y_2(t)$ to pass through a high pass filter 13. For example, the low pass filter 11 and the high pass filter 13 are complementary filters. Therefore, an original signal with no noise is obtained by adding an output value of the low pass filter 11 and an output value of the high pass filter 13 as follows.

$$G(s)x(t)+(1-G(s))x(t)=x(t) \quad [\text{Math. 1}]$$

Figure 2:
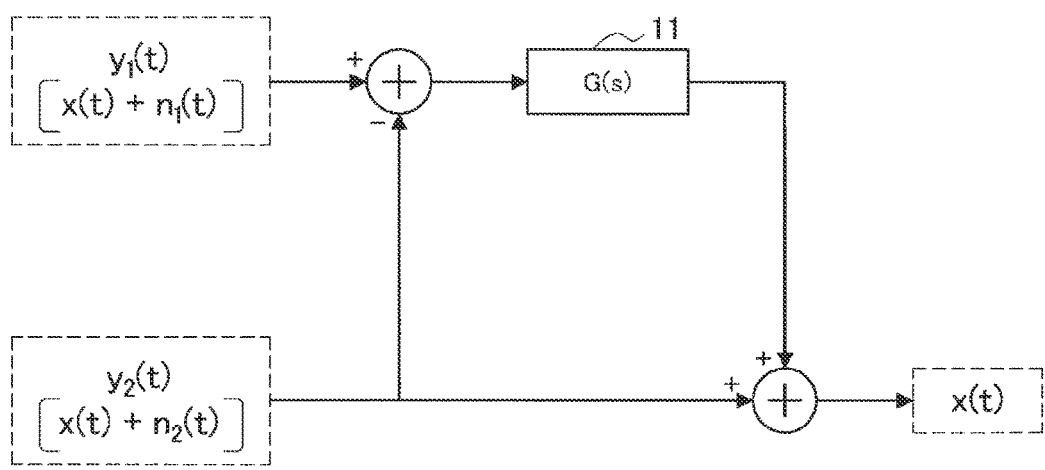
FIG. 2 is an explanatory diagram for explaining a second example of posture estimation using a combination of a gyro sensor and an acceleration sensor.

FIG. 2 is an explanatory diagram for explaining a second example of posture estimation using a combination of a gyro sensor and an acceleration sensor. Referring to FIG. 2, the posture $y_1(t)$ is calculated from the acceleration that is detected by the acceleration sensor, and the posture $y_2(t)$ is calculated from the angular velocity that is detected by the gyro sensor in the same manner as in the example in FIG. 1. In particular, the posture $y_2(t)$ is subtracted from the posture $y_1(t)$ instead of using the high pass filter 13, and a difference obtained as a result (that is, $n_1(t)-n_2(t)$) is made to pass through the low pass filter 11. As a result, a negative value of the low-frequency noise $n_2(t)$ is output. Then, the low-frequency noise $n_2(t)$ is subtracted from the posture $y_2(t)$, and as a result, the original signal with no noise is obtained.

$$y_2(t)-n_2(t)=(x(t)+n_2(t))-n_2(t)=x(t) \qquad \text{[Math. 2]}$$

In addition, it is possible to eliminate a delay at the high pass filter 13 by not using the high pass filter 13 as described above.

(3) Position Estimation

(a) Position Estimation Using Inertial Sensor

Based on the posture calculated as described above, the acceleration that is detected by the acceleration sensor (that is, acceleration in a coordinate system of the acceleration sensor) is converted into an acceleration in a ground coordinate system (for example, acceleration from the ground).

Furthermore, a variation in the velocity of the flight vehicle is calculated by integrating the acceleration after the conversion. Therefore, the velocity of the flight vehicle is calculated from an initial value of the velocity of the flight vehicle and the variation in the velocity of the flight vehicle.

Furthermore, a variation in the position of the flight vehicle is calculated by integrating the velocity. Therefore, the position of the flight vehicle is calculated from an initial value of the position of the flight vehicle and the variation in the position of the flight vehicle.

The acceleration detected by the acceleration sensor includes noise. Therefore, errors in the position of the flight vehicle that is calculated from the acceleration are accumulated over time.

(b) Sensor Fusion

In order to avoid the accumulation of errors as described above, highly reliable position estimation is realized by a combination of the inertial sensor and another sensor. For example, position estimation using a combination of the inertial sensor and a GPS receiver is realized. Hereinafter, a condition example will be described with reference to FIG. 3.

Figure 3:
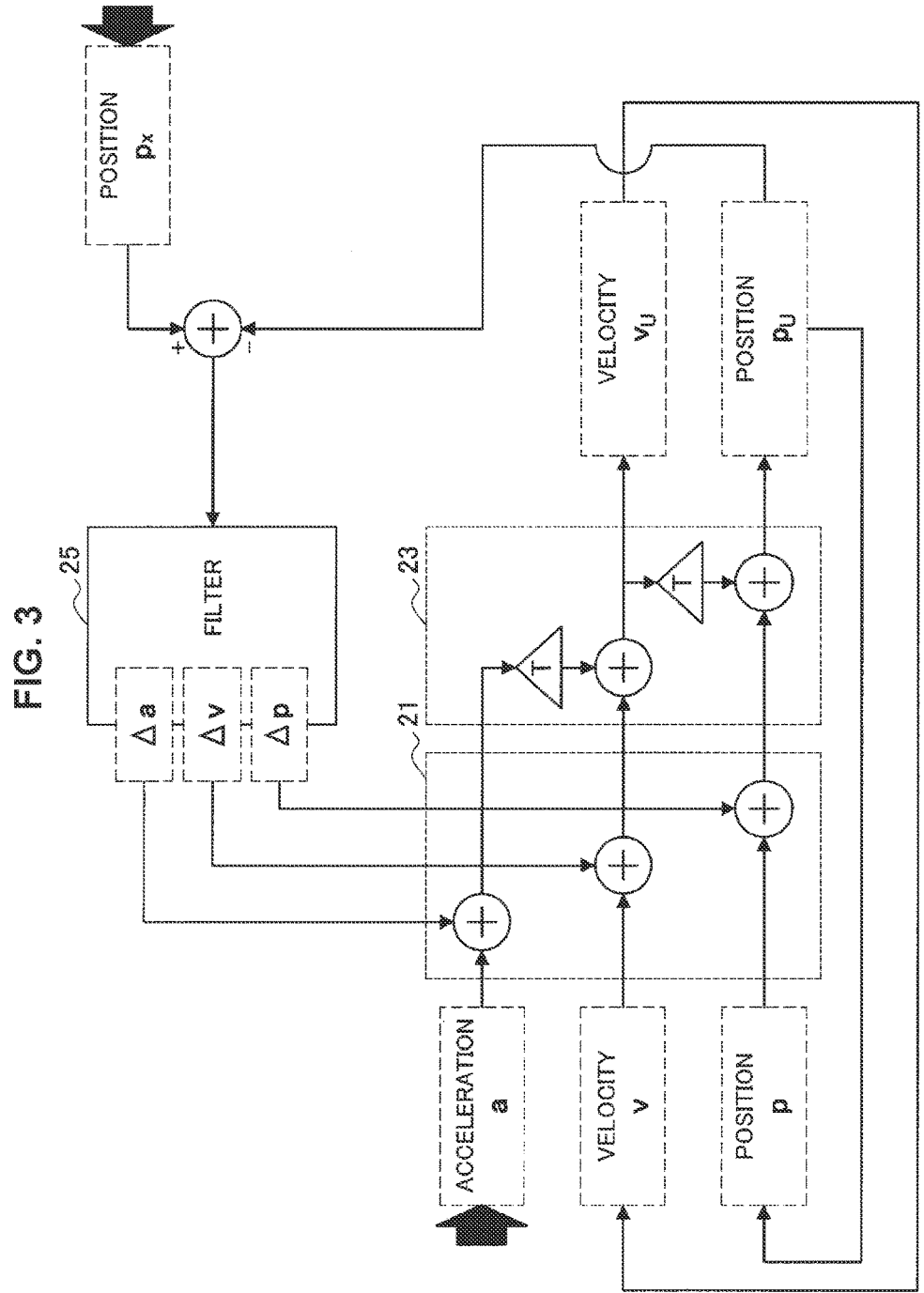
FIG. 3 is an explanatory diagram for explaining an example of position estimation using a combination of an inertial sensor and another sensor.

FIG. 3 is an explanatory diagram for explaining an example of position estimation using a combination of the inertial sensor and another sensor. Referring to FIG. 3, acceleration a in the ground coordinate system is obtained by conversion of the acceleration that is detected by the acceleration sensor. The acceleration a is corrected at a portion 21 and is integrated at a portion 23, and as a result, a variation in the velocity is calculated. The already calculated velocity v is corrected at the portion 21, and the above variation is made at the portion 23. As a result, a velocity $v_U$ after updating is obtained. Also, the velocity $v_U$ after the updating is integrated at the portion 23, and as a result, a variation in the position is calculated. An already calculated position p is corrected at the portion 21, and the above variation is made at the portion 23. As a result, a position $p_U$ after updating is obtained. Furthermore, a difference (for example, $p_x-p_U$) between the position $p_x$ generated by using another sensor (for example, the GPS receiver) and the position $p_U$ after the updating is calculated as an error e, and the error e is made to pass through a filter 25. As a result, a correction value $\Delta a$ of the acceleration, a correction value $\Delta v$ of the velocity, and a correction value $\Delta p$ of the position are output. Then, these correction values are used for the correction at the portion 21. As described above, the inertial sensor is complemented by another sensor (for example, the GPS receiver).

The processing at the filter 25 is represented as follows.

$$\Delta a_t = \Delta a_{t-1} + k_3 \Delta te$$

$$\Delta v_t = k_2 \Delta te$$

$$\Delta p_t = \Delta p_{t-1} + k_1 \Delta te \qquad \text{[Math. 3]}$$

$\Delta a_t$, $\Delta v_t$, and $\Delta p_t$ are correction values after the updating, and $\Delta a_{t-1}$, $\Delta v_{t-1}$, and $\Delta p_{t-1}$ are correction values before the updating. $k_1$, $k_2$, and $k_3$ are represented as follows by using a time constant $T_c$ of the filter 25.

$$k_1 = \frac{3}{T_c}, k_2 = \frac{3}{T_c^2}, k_3 = \frac{1}{T_c^3} \qquad \text{[Math. 4]}$$

2. OUTLINE CONFIGURATION OF SYSTEM

Next, an outline configuration of a system 1 according to the embodiment of the present disclosure will be described with reference to FIG. 4. FIG. 4 is an explanatory diagram illustrating an example of an outline configuration of the system 1 according to the embodiment of the present disclosure. Referring to FIG. 4, the system 1 includes a flight vehicle 100, a control device 200, and a piloting device 300.

(1) Flight Vehicle 100

The flight vehicle 100 is a device that is capable of flying. For example, the flight vehicle 100 can fly using a plurality of rotors (for example, four rotors). For example, the flight vehicle 100 may perform stationary hovering, movement (movement upward, movement downward, horizontal movement, and movement in an oblique direction, for example), and turning, for example by controlling rotation of the respective rotors. The flight vehicle 100 may be a device that is capable of flying by using a mechanism other than rotors.

For example, the flight vehicle 100 can estimate the posture and the position of the flight vehicle 100 itself and control the flight based on the posture and the position. For example, the flight vehicle 100 automatically flies based on a designated flight route.

For example, the flight vehicle 100 communicates with other devices (for example, a control device 200). The flight vehicle 100 may perform direct wireless communication with other devices or may communicate with other devices via a relay node by performing wireless communication with the relay node.

For example, the flight vehicle 100 includes an imaging device and uses the imaging device to capture images during flight. The flight vehicle 100 may save the captured images generated by the image capturing or may send the captured images to another device such as the control device 200. The captured images may be stationary images or moving images.

(2) Control Device 200

The control device 200 is a device that executes control in relation to the flight of the flight vehicle 100. For example, the control includes generation and provision of flight information for the flight vehicle 100 (for example, information that indicates the flight route) and/or instructions to the flight vehicle 100 (for example, an instruction for taking off and/or an instruction for returning) and/or the like.

For example, the control device 200 communicates with the flight vehicle 100. The control device 200 may perform direct wireless communication with the flight vehicle 100 or may communicate with the flight vehicle 100 via the relay node.

For example, the control device 200 acquires the captured images generated by the flight vehicle 100 capturing the images and displays the captured images as needed. The captured images may be moving images, and the control device 200 may acquire and display the moving images as streaming.

In one example, the control device 200 may be a portable device such as a laptop computer or a tablet terminal. In addition, it is a matter of course that the control device 200 is not limited to these examples and may be another type of device.

(3) Piloting Device 300

The piloting device 300 is a device that enables a user to pilot the flight vehicle 100. In one example, the piloting device 300 is a proportional system (or a propo).

For example, the piloting device 300 is connected to the control device 200. The piloting device 300 generates control information in relation to operations of the flight vehicle in response to a manipulation by the user and transmits the control information to the control device 200. The control device 200 may transmit the control information to the flight vehicle 100 or may generate different control information from the control information and transmit the different control information to the flight vehicle 100.

3. CONFIGURATION OF FLIGHT VEHICLE

Figure 5:
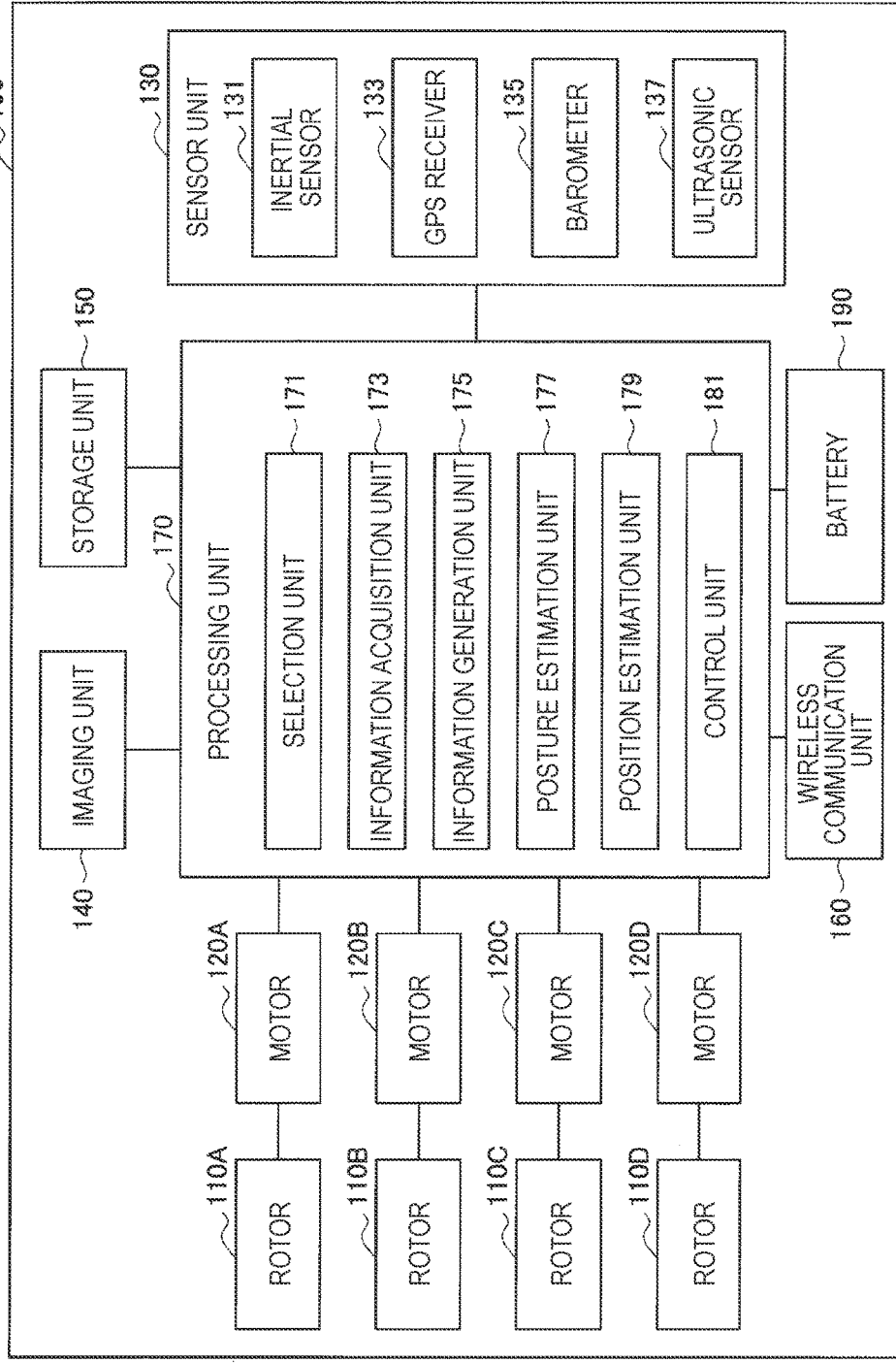
FIG. 5 is a block diagram illustrating a configuration of a flight vehicle according to the embodiment.

Next, an example of a configuration of the flight vehicle 100 according to the embodiment of the present disclosure will be described with reference to FIG. 5. FIG. 5 is a block diagram illustrating an example of the configuration of the flight vehicle 100 according to the embodiment of the present disclosure. Referring to FIG. 5, the flight vehicle 100 includes rotors 110, motors 120, a sensor unit 130, an imaging unit 140, a storage unit 150, a wireless communication unit 160, a processing unit 170, and a battery 190.

(1) Rotors 110 and Motors 120

Rotors 110A to 110D cause the flight vehicle 100 to fly by generating lifting force from rotation.

(2) Motors 120

Motors 120A to 120D cause the rotors 110A to 110D to rotate in accordance with control by the processing unit 170 (control unit 181). For example, the motors 120 changes the rotational speed of the rotors 110 in accordance with the control by the processing unit 170 (control unit 181).

(2) Sensor Unit 130

The sensor unit 130 includes one or more sensors. For example, the sensor unit 130 includes an inertial sensor 131, a GPS receiver 133, a barometer 135, and an ultrasonic sensor 137.

For example, the inertial sensor 131 includes an acceleration sensor and a gyro sensor. The inertial sensor 131 may further include a geomagnetic sensor.

The sensors included in the sensor unit 130 are not limited to these examples. The sensor unit 130 may not include one or more sensors (except for the inertial sensor 131) from among the aforementioned sensors. Also, the sensor unit 130 may include other sensors.

(3) Imaging Unit 140

The imaging unit 140 captures images and generates captured images. The captured images may be stationary images or moving images. The captured images may be saved in the storage unit 150 or may be transmitted to another device via the wireless communication unit 160.

The imaging unit 140 includes one or more imaging devices. Each of the one or more imaging devices includes a lens, an image sensor, and the like. The one or more imaging devices may include an infrared imaging device and/or an omnidirectional imaging device.

(4) Storage Unit 150

The storage unit 150 stores various kinds of information. The storage unit 150 stores programs and/or various kinds of data for operations of the flight vehicle 100.

For example, the storage unit 150 includes a non-volatile memory (for example, a memory card). The storage unit 150 may include a magnetic storage device (for example, a hard disk drive) instead of or in addition to a non-volatile memory.

(5) Wireless Communication Unit 160

The wireless communication unit 160 performs wireless communication. The wireless communication unit 160 may perform direct wireless communication with other devices (for example, the control device 200) or may perform wireless communication with the relay node for communication with other devices.

For example, the wireless communication unit 160 includes an antenna, an RF (Radio Frequency) circuit, and/or a base band processor.

(6) Processing Unit 170

The processing unit 170 performs various kinds of processing of the flight vehicle 100. The processing unit 170 includes a selection unit 171, an information acquisition unit 173, an information generation unit 175, a posture estimation unit 177, a position estimation unit 179, and a control unit 181. The processing unit 170 can further include components other than these components. That is, the processing unit 170 can perform operations other than operations of these components.

For example, the processing unit 170 includes circuitries. More specifically, the processing unit 170 includes one or more integrated circuits, for example. For example, the one or more integrated circuits hold programs for operations of the processing unit 170. For example, the selection unit 171, the information acquisition unit 173, the information generation unit 175, the posture estimation unit 177, the position estimation unit 179, and the control unit 181 can be implemented as the programs. The one or more integrated circuits may include an SoC (System-on-a-Chip), a micro controller, and/or other processors.

(a) Posture Estimation Unit 177

The posture estimation unit 177 estimates the posture of the flight vehicle 100.

For example, the posture estimation unit 177 acquires information generated by using the inertial sensor 131 and estimates the posture of the flight vehicle 100 from the information. For example, the information represents information that indicates the angular velocity detected by the gyro sensor included in the inertial sensor 131 and information that indicates the acceleration detected by the acceleration sensor included in the inertial sensor 131. The posture estimation of the flight vehicle 100 is as described above as the basic posture estimation, for example. Therefore, detailed description will be omitted here.

(b) Position Estimation Unit 179

The position estimation unit 179 estimates the position of the flight vehicle 100. This point will be described later in detail.

(c) Control Unit 181

The control unit 181 performs control in relation to flight of the flight vehicle 100.

(c-1) Control of Rotors 110

For example, the control unit 181 controls rotation of the rotors 110. Specifically, the control unit 181 controls operations of the motors 120, thereby controlling the rotation of the rotors 110, for example.

For example, the control unit 181 adjusts the respective rotational speeds of the rotors 110A, 110B, 110C, and 110D, thereby causing the flight vehicle 100 to perform stationary hovering, movement (movement upward, movement downward, horizontal movement, or movement in an oblique direction, for example), or turning.

More specifically, it is possible to change the posture (inclinations of a roll axis, a pitch axis, and a yaw axis) of the flight vehicle 100 by adjusting the respective numbers of rotations of the rotors, for example. Therefore, it is possible to incline the flight vehicle 100 with respect to the roll axis and the pitch axis, and as a result, propulsion force in the horizontal direction is generated, and the flight vehicle 100 moves in the horizontal direction. Also, a moving velocity in the up-down direction changes in accordance with an increase or a decrease in the numbers of rotations of the rotors, for example.

(c-2) Posture Control of Flight Vehicle 100

For example, the control unit 181 controls the posture of the flight vehicle 100.

For example, the control unit 181 corrects an error between the posture of the flight vehicle 100 estimated by the posture estimation unit 177 and a target posture. More specifically, the control unit 181 calculates the error and calculates rotation of the rotors 110 (or an operation of the motors 120) for correcting the error, for example. Then, the control unit 181 controls the rotation of the rotors 110 as described above.

(c-3) Position Control of Flight Vehicle 100

For example, the control unit 181 controls the position of the flight vehicle 100.

Example of Control

For example, the control unit 181 moves the flight vehicle 100 from the position of the flight vehicle 100 estimated by the position estimation unit 179 to a target position. More specifically, the control unit 181 calculates movement from the position of the flight vehicle 100 to the target position and calculates a target posture that allows the movement, for example. Then, the control unit 181 corrects an error between the posture of the flight vehicle 100 and the target posture as described above.

Example of Acquisition of Target Position

In one example, the control unit 181 acquires one or more target positions from flight route information that the control unit 181 holds. The flight route information may indicate one or more target positions, or the control unit 181 may calculate one or more target positions from the flight route information.

In another example, the control device 200 may transmit information that indicates target positions, and the control device unit 181 may acquire the positions that indicate the target positions.

(c-4) Others

Operations of the selection unit 171, the information acquisition unit 173, and the information generation unit 175 will be described later in detail along with operations of the position estimation unit 179.

(7) Battery 190

The battery 190 accumulates electric power for causing the flight vehicle 100 to operate. The battery 190 may be a primary battery capable only of discharging or may be a secondary battery also capable of being charged.

4. POSITION ESTIMATION ACCORDING TO EMBODIMENT OF PRESENT DISCLOSURE

Next, an example of position estimation according to the embodiment of the present disclosure will be described.

(1) Plurality of Position Estimation Systems

According to the embodiment of the present disclosure, a plurality of position estimation systems for estimating the position of the flight vehicle 100 are prepared. For example, the plurality of position estimation systems include at least one of a system using a GPS receiver, a system using an imaging device installed on the flight vehicle 100, a system using an imaging device for imaging the flight vehicle 100, a system using a barometer, and a system using an ultrasonic sensor.

(a) System Using GPS Receiver

For example, there is a system using a GPS receiver as a position estimation system.

The GPS receiver estimates the position in response to reception of signals from a plurality of GPS satellites. That is, the GPS receiver calculates the latitude, the longitude, and the altitude in response to reception of the signals from the plurality of GPS satellites. Thus, the GPS receiver 133 of the flight vehicle 100 estimates the position of the flight vehicle 100. That is, the GPS receiver 133 of the flight vehicle 100 calculates the latitude, the longitude, and the altitude of the flight vehicle 100.

(b) System Using Imaging Device Installed on Flight Vehicle 100

For example, there is a system using an imaging device installed on the flight vehicle 100 as a position estimation system.

(b-1) SLAM

For example, the system using the imaging device installed on the flight vehicle 100 includes SLAM (Simultaneous Localization and Mapping).

Monocular SLAM

For example, there is SLAM using a monocular imaging device (hereinafter, referred to as "monocular SLAM"). Monocular SLAM utilizes disparity of a feature point in a captured image, which is generated by movement, and simultaneously estimates the three-dimensional position of the feature point and the position and the posture of the camera.

Since it may become uncertain whether the feature point is present at a far position and has a large size or the feature point is present at a close position and has a small size, this system requires presenting a feature point with a known size at the time of initialization. Since disparity of the feature point does not occur in a case where the flight vehicle 100 stays and turns at the same location, the distance to the feature point becomes uncertain, and it can be difficult to estimate the position and the posture by utilizing a new feature point.

In order to compensate for these weak points, the monocular imaging device is installed on the flight vehicle 100 such that an optical axis of the monocular imaging device coincides with an axis of the flight vehicle 100 in the up-down direction, for example. Furthermore, the monocular imaging device is installed on the flight vehicle 100 by using a gimbal. That is, SLAM that uses a monocular imaging device installed on the flight vehicle 100 by using a gimbal such that the optical axis coincides with the axis of the flight vehicle 100 in the up-down direction (hereinafter, referred to as "monocular SLAM with a gimbal") is prepared as the position estimation system. For example, the optical axis is a vertical axis. Hereinafter, specific examples of this point will be described with reference to FIGS. 6 and 7.

Figure 6:
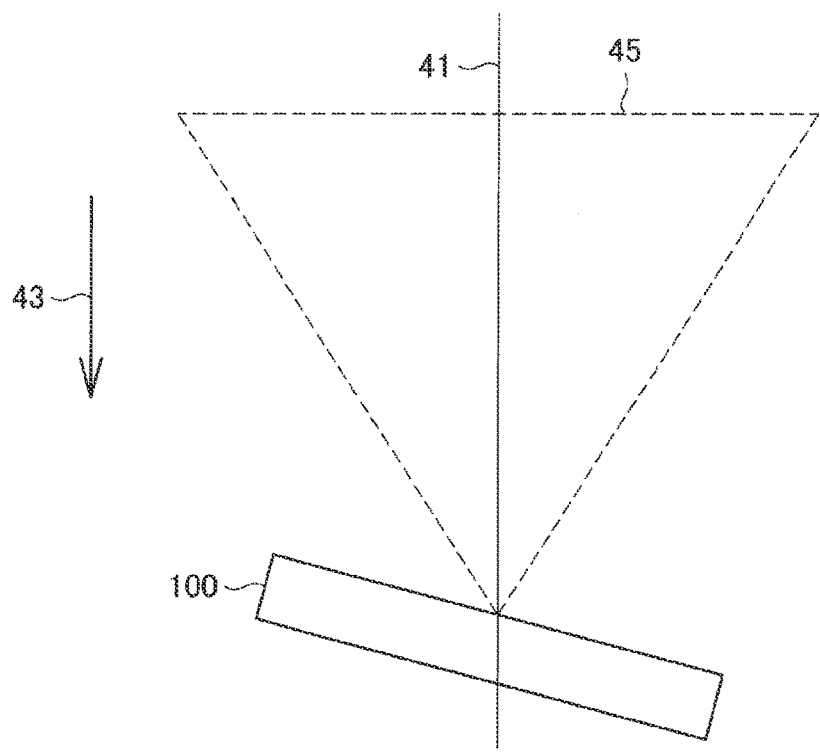
FIG. 6 is an explanatory diagram for explaining a first example of imaging by a monocular imaging device installed on the flight vehicle by using a gimbal.

FIG. 6 is an explanatory diagram for explaining a first example of imaging by the monocular imaging device installed on the flight vehicle 100 by using a gimbal. Referring to FIG. 6, the flight vehicle 100 is illustrated. In this example, the monocular imaging device is installed on the upper side of the flight vehicle 100 by using a gimbal such that an optical axis 41 coincides with the vertical axis (the axis in a vertical direction 43). The use of the gimbal maintains the optical axis 41 such that it coincides with the vertical axis even if the flight vehicle 100 inclines. Therefore, the monocular imaging device always images a range 45 in a direction opposite to the vertical direction 43.

Figure 7:
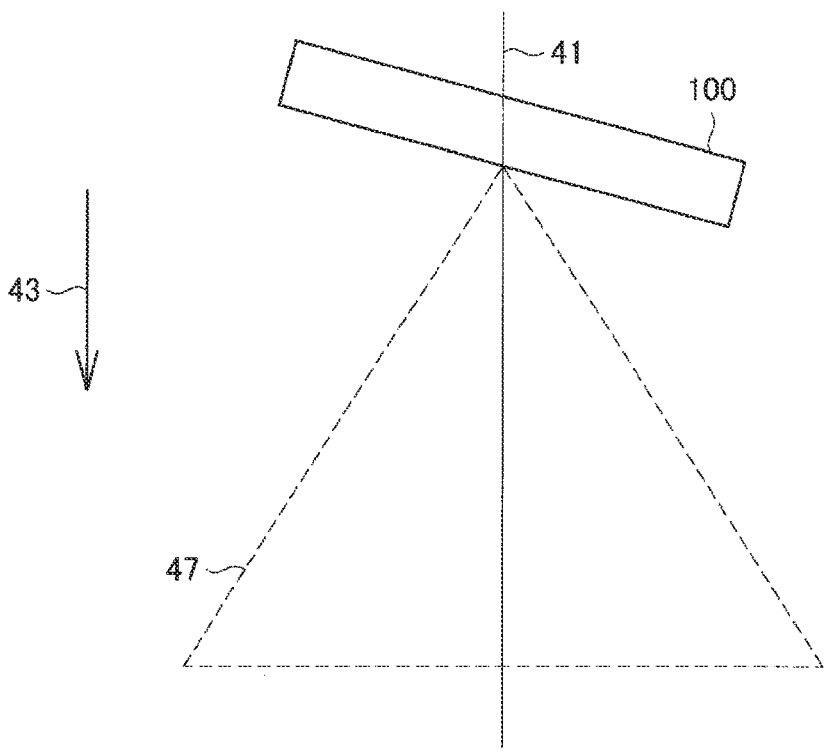
FIG. 7 is an explanatory diagram for explaining a second example of imaging by a monocular imaging device installed on the flight vehicle by using a gimbal.

FIG. 7 is an explanatory diagram for explaining a second example of imaging by a monocular imaging device installed on the flight vehicle 100 by using a gimbal. Referring to FIG. 7, the flight vehicle 100 is illustrated. In this example, the monocular imaging device is installed on the lower side of the flight vehicle 100 by using the gimbal such that the optical axis 41 coincides with the vertical axis (the axis in the vertical direction 43). The use of the gimbal maintains the optical axis 41 such that it coincides with the vertical axis even if the flight vehicle 100 inclines. Therefore, the monocular imaging device always images a range 47 in the vertical direction 43.

By installing the monocular imaging device on the flight vehicle 100 such that the optical axis coincides with the up-down direction of the flight vehicle 100 as described above, it is possible to allow turning at a single location, when it is difficult for disparity to be caused, to coincide with the roll axis and the pitch axis of the flight vehicle 100, for example. The flight vehicle 100 causes inclination with respect to the roll axis and the pitch axis for moving, and the inclination is within a range of ±15 degrees. Accordingly, since there is a low probability that the feature point will have been replaced with a new one by the turning, it is difficult for estimation of the position to become difficult. Furthermore, the installation by using the gimbal makes it possible to always image a range in the vertical direction or a range in a direction opposite to the vertical direction, for example. Therefore, a robustness of the position estimation can be improved.

If a texture pattern of a taking-off and landing location (for example, a heliport) of the flight vehicle 100 is stored in advance, for example, the taking-off and landing location can be used as the feature point with the known size when the flight vehicle 100 takes off. In this manner, the position estimation can be performed more precisely.

Stereo SLAM

For example, there is SLAM using a stereo imaging device (hereinafter, referred to as "stereo SLAM"). Stereo SLAM utilizes disparity of two cameras and estimates the three-dimensional position of a feature point. Therefore, it is possible to estimate the position without movement of the flight vehicle 100. Also, it is possible to estimate the position without a feature point with a known size.

Features of SLAM

According to the SLAM, errors in the estimated positions are accumulated in accordance with the amount of movement. Therefore, drift can occur in the same manner as in the inertial sensor if the flight vehicle 100 moves a long distance. However, since the amount of errors can be smaller than that for the inertial sensor and the errors do not increase if the same feature point is used, the SLAM can complement the position estimation using the inertial sensor.

(b-2) Markers

For example, the system using the imaging device installed on the flight vehicle 100 includes a system of estimating the position of the flight vehicle based on known positions at which markers have been arranged and a captured image of the markers that is generated by the imaging device installed on the flight vehicle 100.

For example, a plurality of markers are installed in a specific area, and the respective positions of the plurality of markers are held in advance in the flight vehicle 100. If the flight vehicle 100 flies in the specific area, the imaging device installed on the flight vehicle 100 captures an image, and the position of the flight vehicle 100 is estimated from the positions of the respective markers inside the captured image generated by the image capturing and the known positions of the respective markers. In one example, the imaging device is an omnidirectional camera capable of performing omnidirectional image capturing. In one example, each of the plurality of markers is a light-emitting marker (for example, an issuing LED (Light-Emitting Diode)) and appears as a lighting lump in the captured image. Hereinafter, an arrangement example of the markers will be described with reference to FIG. 8.

Figure 8:
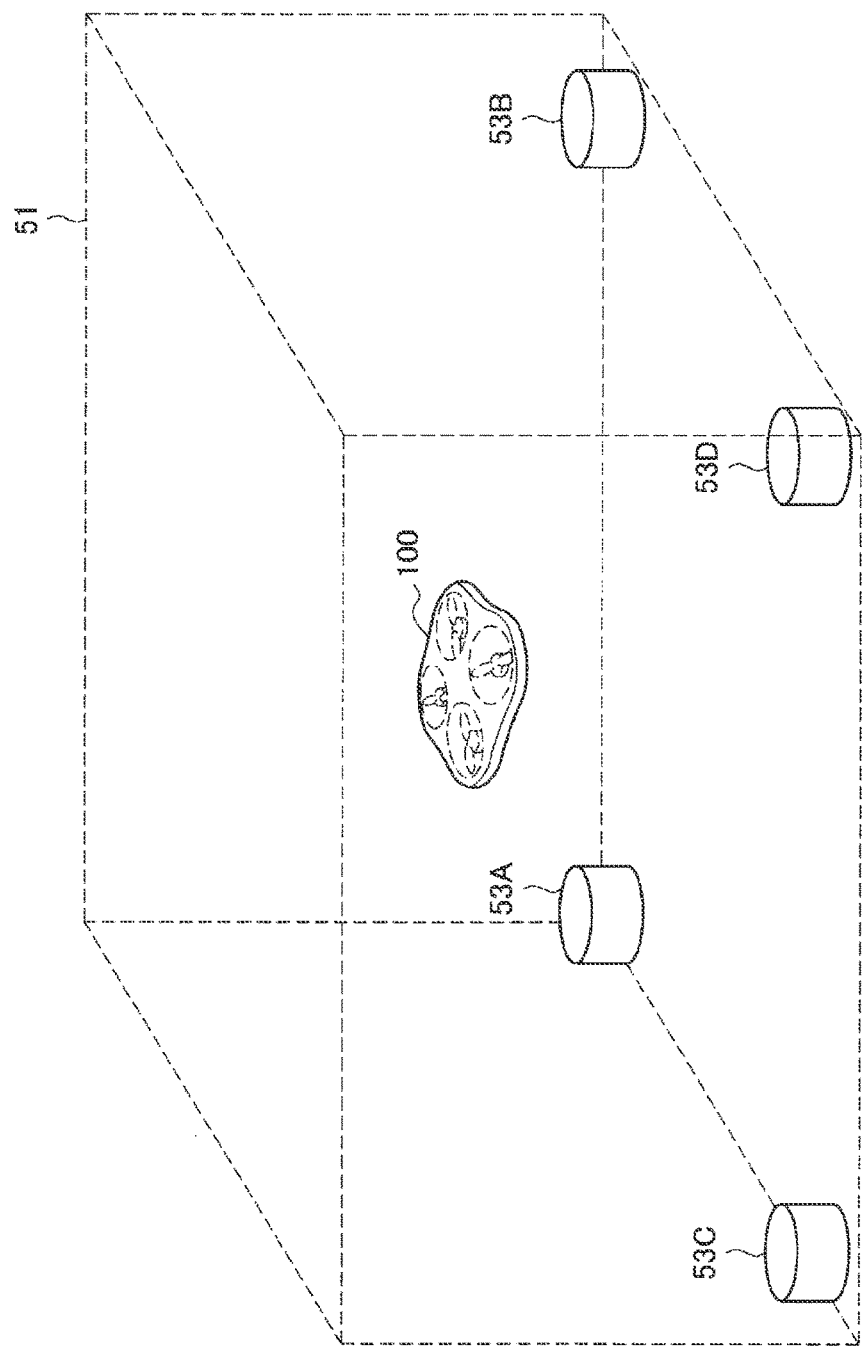
FIG. 8 is an explanatory diagram for explaining an example of marker arrangement.

FIG. 8 is an explanatory diagram for explaining an arrangement example of the markers. Referring to FIG. 8, an area 51 and the flight vehicle 100 that flies in the area 51 are illustrated. In the area 51, four markers 53 are arranged. The imaging device (for example, an omnidirectional camera) installed in the flight vehicle 100 captures an image, and as a result, images the four markers 53. Then, the position of the flight vehicle 100 is estimated from the respective positions of the four markers 53 in the captured image and the known positions of the four markers 53.

For example, a direction from the center in the image captured by the omnidirectional camera to each marker coincides with an actual direction from the omnidirectional camera to the marker. Therefore, a position $(M_i^x, M_i^y)$ of a marker i and an observation direction Theta (Greek letter), and an estimated position (x, y) of the flight vehicle 100 and an estimated direction alpha (Greek letter) are represented as follows.

$$\theta_i(x,y,\alpha)=\alpha-a\tan 2(M_i^y-y, M_i^x-x)+\nu \qquad \text{[Math. 5]}$$

Since there are three unknown numbers (that is, x, y, and alpha (Greek letter)) and there are four observation points (four markers), the three unknown numbers are calculated by a non-linear optimization problem.

It is a matter of course that a method of calculating the estimated position (x, y) and the estimated direction alpha (Greek letter) is not limited to the aforementioned example. In one example, a plurality of candidates for the estimated position (x, y) and the estimated direction alpha (Greek letter) may be prepared in advance, and the observation direction theta (Greek letter) may be calculated from candidates included in the plurality of candidates in accordance with the aforementioned equation. Then, a difference between the calculated observation direction and an actual observation direction obtained from the captured image may be calculated as an error, and further, likelihoods for the candidates may be calculated from the calculated error. Then, one candidate may be selected from among the plurality of candidates based on the likelihood of each of the plurality of candidates, and the one candidate may be estimated as the position and the direction of the flight vehicle 100. At this time, a particle filter may be used.

There is a possibility that the light-emitting markers are lost in the captured image due to reflection of sunlight or the like in the outdoor space. Cutting of visible light by a filter can also make it difficult to perform separation. Therefore, the light-emitting markers may have a specific light-emitting pattern, for example. Then, the light-emitting markers with the specific light-emitting pattern may be detected in the captured image.

In the position estimation system as described above (that is, a position estimation system based on the captured image of the markers), no errors are accumulated in proportion to time. Therefore, such a position estimation system can complement the position estimation using the inertial sensor.

(c) System Using Imaging Device that Images Flight Vehicle

For example, there is a system using an imaging device that images the flight vehicle 100 as a position estimation system.

For example, the imaging device images the flight vehicle 100, and the position and the motion of the flight vehicle 100 are calculated based on the captured image in motion capturing. Hereinafter, an example of a case where the motion capturing is used will be described with reference to FIG. 9.

Figure 9:
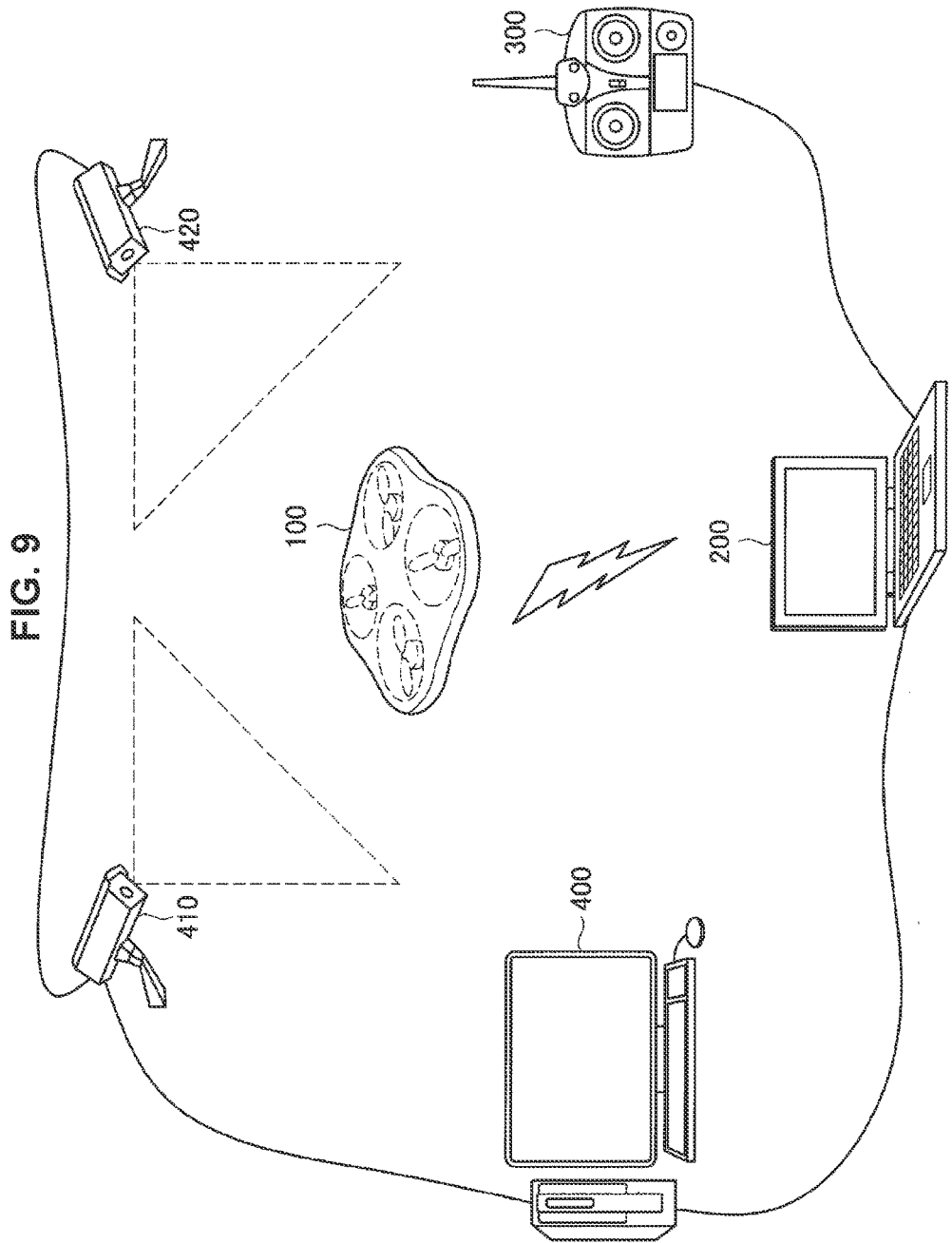
FIG. 9 is an explanatory diagram for explaining an example of a case where motion capturing is used.

FIG. 9 is an explanatory diagram for explaining an example of a case where the motion capturing is used. For example, an information processing device 400 calculates the position and the motion of the flight vehicle 100 based on captured images generated by imaging devices 410 and 420. Then, the information processing device 400 transmits information that indicates the position (and the motion) to the flight vehicle 100. In one example, the information processing device 400 transmits the information to the flight vehicle 100 via the control device 200. The information processing device 400 may transmit the information to the flight vehicle 100 directly or via a relay node. In addition, the information processing device 400 and the control device 200 may be the same device.

In the position estimation system as described above (that is, the system using the imaging device that images the flight vehicle 100), no errors are accumulated in proportion to time. Therefore, such a position estimation system can complement the position estimation using the inertial sensor.

(d) System Using Barometer

For example, there is a system using a barometer as a position estimation system.

For example, the altitude of the flight vehicle 100 is estimated from the atmospheric pressure measured by the barometer 135 of the flight vehicle 100. Specifically, the altitude corresponding to the atmospheric pressure estimated by the barometer 135 of the flight vehicle 100 is estimated as the altitude of the flight vehicle 100.

In the system using the barometer, no errors are accumulated in proportion to time. Therefore, the position estimation system can complement the position estimation using the inertial sensor.

(e) System Using Ultrasonic Sensor

For example, there is a system using an ultrasonic sensor as a position estimation system.

For example, the ultrasonic sensor 137 of the flight vehicle 100 emits an ultrasonic wave in the vertical direction and receives a reflected wave of the ultrasonic wave. Then, the altitude of the flight vehicle 100 is estimated from a time from the emission of the ultrasonic wave to the reception of the reflected wave.

In the system using the ultrasonic sensor, no errors are accumulated in proportion to time. Therefore, the position estimation system can complement the position estimation using the inertial sensor.

(f) Features of Respective Systems

The aforementioned position estimation systems have respectively different features. Hereinafter, a specific example of this point will be described with reference to FIG. 10.

FIG. 10 is an explanatory diagram for explaining features of the respective position estimation systems. Referring to FIG. 10, precision (resolution and/or an error in the position), a sampling frequency, a time delay, a filter time constant, a use environment, and compatibility with the inertial sensor of each position estimation system are shown. The time delay is a time delay that accompanies the position estimation. The filter time constant is a time constant of the filter that is used to calculate the correction values and is a value in accordance with noise properties of the position estimation. In the system using the GPS receiver, for example, the precision ranges from 5 to 10 meters, the sampling frequency ranges from 2 to 5 Hz, and the time delay that accompanies the position estimation ranges from 400 to 600 milliseconds. In the monocular SLAM, the precision is several centimeters, the sampling frequency is about 30 Hz, and the time delay that accompanies the position estimation ranges from 30 to 100 milliseconds. In this manner, the precision, the cycle, the time delay, the filter time constant, the use environment, the compatibility with the inertial sensor, and the like differ depending on the position estimation system.

(2) Selection of Position Estimation System and Position Estimation

The information acquisition unit 173 acquires information that indicates a position estimation system selected from the plurality of position estimation systems for estimating the position of the flight vehicle 100. The position estimation unit 179 estimates the position of the flight vehicle 100 from first information that is generated by using the inertial sensor 131 of the flight vehicle 100 and second information that is generated through the position estimation system based on parameters for the position estimation system.

(a) Plurality of Position Estimation Systems

For example, the plurality of position estimation systems include at least one of the system using the GPS receiver, the system using the imaging device installed on the fight vehicle 100, the system using the imaging device for imaging the flight vehicle 100, the system using the barometer, and the system using the ultrasonic sensor. These position estimation systems are as described above.

(b) Acquisition of Information that Indicates Position Estimation System

In a first example, the selection unit 171 dynamically selects a position estimation system from among the plurality of position estimation system as will be described later. Then, the information acquisition unit 173 acquires information that indicates the position estimation system.

In a second example, the user may select a position estimation system from among the plurality of position estimation systems in a static manner, and information that indicates the position estimation system may be held by the flight vehicle 100. The information acquisition unit 173 may then acquire the information.

For example, the information that indicates the position estimation system is identification information of the position estimation system.

(c) First Information Generated by Using Inertial Sensor 131

For example, the inertial sensor 131 includes an acceleration sensor, and the first information that is generated by using the inertial sensor 131 includes information that indicates acceleration of the flight vehicle 100.

For example, the first information that is generated by using the inertial sensor 131 further includes information that indicates the posture of the flight vehicle 100. The posture is estimated by the posture estimation unit 177 as described above.

(d) Second Information Generated Through Position Estimation System

For example, the second information that is generated through the position estimation system is information that indicates the position of the flight vehicle 100.

(d-1) First Example: Case of System Using GPS Receiver

In a first example, the position estimation system is a system using a GPS receiver. In this case, the information generation unit 175 acquires output information (information that indicates the latitude, the longitude, and the altitude of the fight vehicle 100) of the GPS receiver 133 and generates the second information that indicates the position of the flight vehicle 100 (for example, information that indicates the position of the flight vehicle 100 with respect to a predetermined position as an origin) from the output information, for example. Then, the position estimation unit 179 acquires the second information.

(d-2) Second Example: Case of System Using Imaging Device Installed on Flight Vehicle 100

In a second example, the position estimation system is a system using an imaging device that is installed on the flight vehicle 100 (for example, a position estimation system based on SLAM or a marker captured image). In this case, the information generation unit 175 acquires the captured image generated by the imaging device included in the imaging unit 140 and generates the second information that indicates the position of the flight vehicle 100, based on the captured image, for example. Then, the position estimation unit 179 acquires the second information.

(d-3) Third Example: Case of System Using Imaging Device for Imaging Flight Vehicle 100

In a third example, the position estimation system is a system using an imaging device for imaging the flight vehicle 100. Referring again to FIG. 9, the information processing device 400 generates the second information that indicates the position of the flight vehicle 100, and the second information is transmitted to the flight vehicle 100, for example. Then, the position estimation unit 179 acquires the second information.

(d-4) Fourth Example: Case of System Using Barometer

In a fourth example, the position estimation system is a system using a barometer. In this case, the information generation unit 175 acquires output information (information that indicates an atmospheric pressure) of the barometer 135 and generates the second information that indicates the position of the flight vehicle 100 (for example, information that indicates the altitude of the flight vehicle 100) from the output information. Then, the position estimation unit 179 acquires the second information.

(d-5) Fifth Example: System Using Ultrasonic Sensor

In a fifth example, the position estimation system is a system using an ultrasonic sensor. In this case, the position estimation unit 179 acquires output information (information that indicates a distance) of the ultrasonic sensor 137 as the second information that indicates the position of the flight vehicle 100 (for example, information that indicates the altitude of the flight vehicle 100), for example.

(e) Position Estimation Based on Parameters (e-1) Holding of Parameters

For example, parameters for each of the plurality of position estimation systems are held by the flight vehicle 100. In one example, a table including the parameters for each of the plurality of position estimation systems is held. Then, the position estimation unit 179 acquires the parameters held.

(e-2) Examples of Parameters: Parameter Related to Time Delay

For example, the parameters for the position estimation systems include a parameter related to a time delay that accompanies the position estimation by the position estimation system (hereinafter, referred to as a "time delay parameter").

Example of Time Delay Parameter

In one example, the time delay parameter is the time delay that accompanies the position estimation by the position estimation system. In another example, the time delay parameter may be a difference between the time delay that accompanies the position estimation by the position estimation system and a time delay that accompanies the position estimation using the inertial sensor. An example of the time delay of each position estimation system is as described above with reference to FIG. 10.

Example of Position Estimation

For example, the position estimation unit 179 calculates the correction values from the second information generated through the position estimation system based on the time delay parameter. Then, the position estimation unit 179 estimates the position of the flight vehicle 100 from the first position that is generated by using the inertial sensor 131 and the correction values.

More specifically, the position estimation unit 179 acquires third information that indicates the position of the flight vehicle 100, which has already been estimated, based on the time delay parameter. Then, the position estimation unit 179 calculates the correction values from the second information that is generated through the position estimation system and the third information. Hereinafter, a specific example will be described with reference to FIGS. 3 and 11.

Referring again to FIG. 3, the position estimation unit 179 acquires information that indicates an acceleration a as the first information (the information that is generated by using the inertial sensor 131), for example. Then, the position estimation unit 179 estimates the position $p_U$ of the flight vehicle from the information that indicates the acceleration a and the correction values (the correction value $\Delta a$ of the acceleration, the correction value $\Delta v$ of the velocity, and the correction value $\Delta$ of the position) output by the filter 25. In addition, the position estimation unit 179 acquires the information that indicates the position $p_x$ as the second information that is generated through the position estimation system and acquires information that indicates the position $p_U$ as the third information that indicates the position of the flight vehicle 100, which has already been estimated. Then, the position estimation unit 179 calculates a difference between the position $p_x$ and the position $p_U$ as an error e from the information that indicates the position $p_x$ and the information that indicates the position $p_U$ and causes the error e to pass through the filter 25, thereby calculating the correction values (the correction value $\Delta a$ of the acceleration, the correction value $\Delta v$ of the velocity, and the correction value $\Delta$ of the position). In particular, the position estimation unit 179 acquires the information that indicates the position $p_U$ (third information) based on the parameter related to the time delay that accompanies the position estimation by the position estimation system (that is, the time delay parameter).

FIG. 11 is an explanatory diagram for explaining an example of position estimation based on the time delay parameter. Referring to FIG. 11, third information 61 that indicates the position $p_U$ of the flight vehicle 100 and second information 63 that is generated through the position estimation system (information that indicates the position $p_x$) are illustrated. For example, a time delay 65 that accompanies the position estimation using the inertial sensor 131 (that is, a time delay that accompanies generation of the third information 61) is significantly shorter than a time delay 67 (that is, a time delay that accompanies generation of the second information) that accompanies position estimation by the position estimation system (for example, the system using the GPS receiver). Therefore, if second information 63A obtained at time T3 and third information 61F as the latest information at that time are simply acquired and the difference between the position $p_x$ that is indicated by the second information 63A and the position $p_U$ that is indicated by the third information 61F is calculated as the error e, the error e can be an inappropriate value. That is, the error in the positions at different times is calculated as the error e. Thus, the position estimation unit 179 acquires the third information 61A that indicates the position per time T1 preceding time T3 by the time delay 67 and the second information 63A based on the parameter that indicates the time delay 67 (or the parameter that indicates the difference between the time delay 67 and the time delay 65), for example. Then, the position estimation unit 179 calculates, as the error e, a difference between the position $p_x$ that is indicated by the second information 63A and the position $p_U$ that is indicated by the third information 61A. Similarly, the position estimation unit 179 acquires third information 61F that indicates the position per time T2 and second information 63B. Then, the position estimation unit 179 calculates, as the error e, a difference between the position $p_x$ that is indicated by the second information 63B and the position $p_U$ that is indicated by the third information 61F. The position $p_U$ (that is, the third information 61) is held for a period corresponding at least to the time delay 67 in order to calculate the error e.

The position of the flight vehicle 100 is estimated based on the time delay parameter for the position estimation system as described above, for example. In this manner, appropriate correction values suitable for the position estimation system are calculated, for example. As a result, the position of the flight vehicle 100 can be more favorably estimated. Hereinafter, specific examples of this point will be described with reference to FIGS. 12 and 13.

FIG. 12 is an explanatory diagram for explaining an example of a result of position estimation without using the time delay parameter. In this example, the system using the GPS receiver is used as the position estimation system. A position 1010 that is estimated by using the inertial sensor varies in accordance with movement of the flight vehicle 100. In contrast, a position 1020 estimated by using the GPS receiver does not vary immediately after the movement of the flight vehicle 100. Since the position estimation is performed without using the time delay parameter for the position estimation system (that is, the system using the GPS receiver) in this example, an estimation position 1030 is returned to the original position due to the position 1020 that does not vary.

Figure 13:
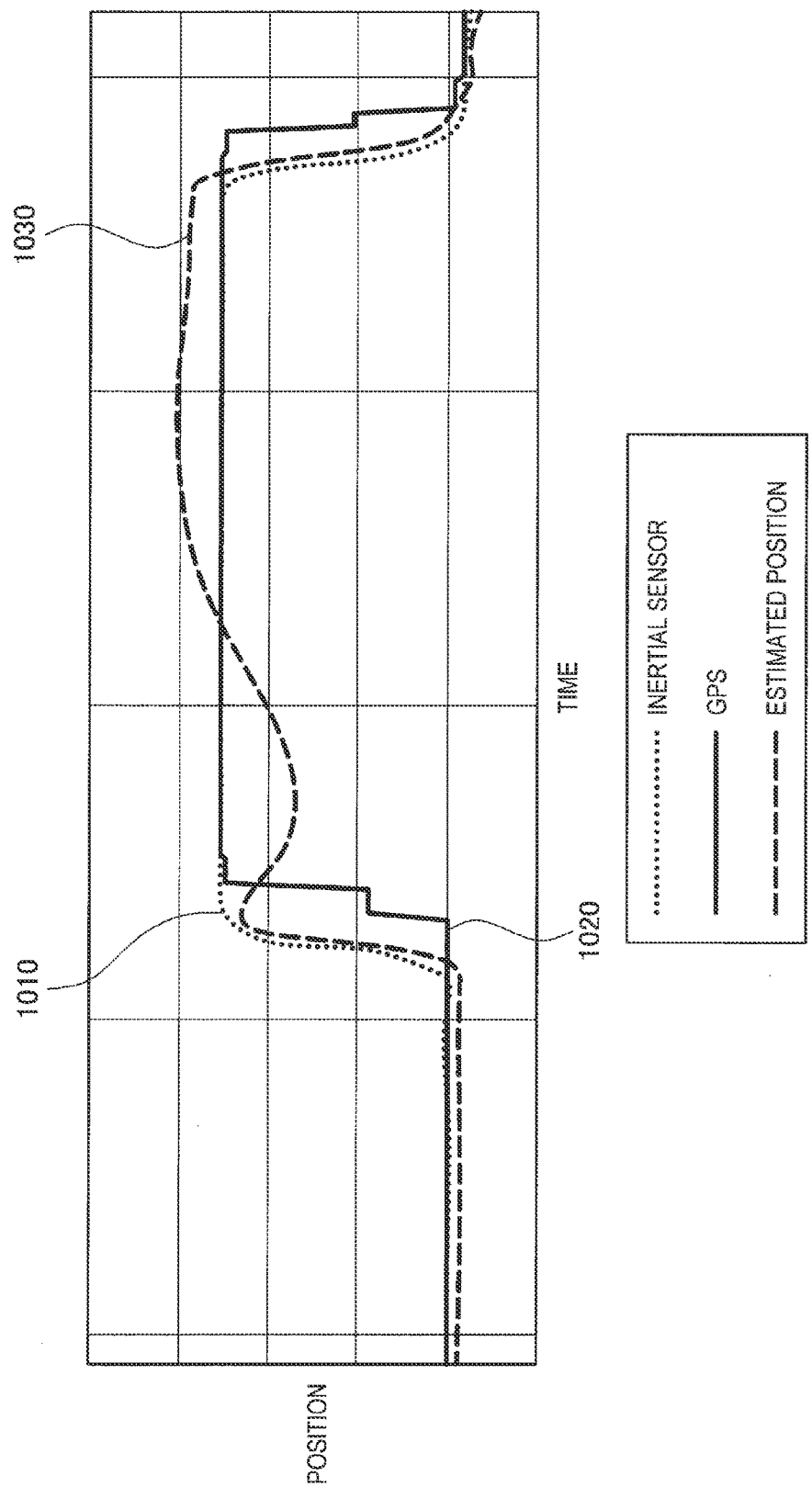
FIG. 13 is an explanatory diagram for explaining an example of a result of position estimation based on the time delay parameter.

FIG. 13 is an explanatory diagram for explaining an example of a result of position estimation based on the time delay parameter. In this example, the system using the GPS receiver is also used as the position estimation system. The position 1010 that is estimated by using the inertial sensor varies in accordance with movement of the flight vehicle 100. In contrast, the position 1020 that is estimated by using the GPS receiver does not vary immediately after the movement of the flight vehicle 100. Since the position estimation is performed based on the time delay parameter for the position estimation system (that is, the system using the GPS receiver) in this example, returning of the estimation position 1030 due to the position 1020 that does not vary is reduced, and a favorably estimated position 1030 is obtained.

(e-3) Example of Parameter: Parameter Related to Noise Properties

For example, the parameters for the position estimation system includes a parameter related to properties of noise that accompanies the position estimation by the position estimation system (hereinafter, referred to as a "noise property parameter").

Example of Noise Property Parameter

In one example, the noise property parameter is a time constant of a filter that is used to calculate the correction values. Referring again to FIG. 3, the noise property parameter is a time constant of the filter 25, for example. The example of the filter time constant of each position estimation system is as described above with reference to FIG. 10.

In another example, the noise property parameter may be a band of the noise. Then, the time constant of the filter may be calculated from the noise property parameter (the band of the noise).

Example of Position Estimation

For example, the position estimation unit 179 calculates the correction values from the second information that is generated through the position estimation system based on the noise property parameter. Then, the position estimation unit 179 estimates the position of the flight vehicle 100 from the first information that is generated by using the inertial sensor 131 and the correction values.

Referring again to FIG. 3, the time constant (that is, the noise property parameter) for the position estimation system selected from among the plurality of position estimation systems is set as a time constant $T_c$ of the filter 25, for example. The time constant is a time constant corresponding to a property of the noise that accompanies the position estimation by the position estimation system. The position estimation unit 179 acquires information that indicates the position $p_x$ as the second information that is generated through the position estimation system and calculates, as the error e, a difference between the position $p_x$ and the position $p_U$ of the flight vehicle 100, which has already been estimated. Then, the position estimation unit 179 causes the error e to pass through the filter 25 (time constant $T_c$=noise property parameter), thereby calculating the correction values (the correction value Δa of acceleration, the correction value Δv of the velocity, and the correction value Δ of the position). Then, the position estimation unit 179 estimates the position $p_U$ of the flight vehicle 100 from the first information (for example, information that indicates the acceleration a) that is generated by using the inertial sensor 131 and the correction values.

For example, the position of the flight vehicle 100 is estimated based on the noise property parameter for the position estimation system as described above. In this manner, appropriate correction values suitable for the position estimation system are calculated, for example. As a result, the position of the flight vehicle can be more favorably estimated.

As described above, the position estimation unit 179 estimates the position of the flight vehicle 100 based on the parameter for the position estimation system selected from among the plurality of position estimation systems. In this manner, it is possible to apply not only the position estimation system using the GPS receiver but also another position estimation system, for example. Therefore, it is possible to more favorably estimate the position of the flight vehicle 100 even if it is difficult to estimate the position by the GPS receiver. In addition, since features (for example, a time delay and/or a noise property) of the position estimation system are reflected in the position estimation even if the position estimation system is switched between the plurality of position estimation systems, the position of the flight vehicle 100 can be more favorably estimated. In addition, it is possible to more easily switch the position estimation system between the plurality of position estimation systems.

(3) Dynamic Selection of Position Estimation System

For example, the selection unit 171 dynamically selects the position estimation system from among the plurality of position estimation systems during flight of the flight vehicle 100. That is, the position estimation system is switched between the plurality of position estimation systems during flight of the flight vehicle 100.

(a) Transfer of Initial Value

If a new position estimation system is selected, for example, the initial value of the position estimation is provided for the position estimation by the new position estimation system.

(a-1) Operation of Respective Components

For example, the selection unit 171 selects a first position estimation system from among the plurality of position estimation systems. Then, the information acquisition unit 173 acquires information that indicates the first position estimation system. Then, the position estimation unit 179 estimates the position of the flight vehicle 100 from first information that is generated by using the inertial sensor 131 and second information that is generated through the first position estimation system based on the parameter for the first position estimation system.

Furthermore, the selection unit 171 selects a second position estimation system from among the plurality of position estimation systems after the selection of the first position estimation system. In particular, the selection unit 171 provides the estimated position as an initial value of the position estimation by the second position estimation system. For example, the information generation unit 175 performs the position estimation by the second position estimation system, and the selection unit 171 provides the estimated position as the initial value to the information generation unit 175.

Then, the information acquisition unit 173 acquires information that indicates the second position estimation system. Thereafter, the position estimation unit 179 estimates the position of the flight vehicle 100 from the first information that is generated by using the inertial sensor 131 and the second information that is generated through the second position estimation system based on the parameter for the second position estimation system.

(a-2) Example of Position Estimation System

For example, the second position estimation system is a system for estimating a relative position of the first vehicle 100. More specifically, the second position estimation system is a system using an imaging device that is installed on the flight vehicle 100 (for example, a position estimation system based on SLAM or a captured image of markers), for example.

For example, the first position estimation system is a system for estimating an absolute position of the flight vehicle 100. More specifically, the first position estimation system is a system using a GPS receiver, a system using an imaging device for imaging the flight vehicle 100, a system using a barometer, or a system using an ultrasonic sensor. In addition, the first position estimation system may also be a system for estimating the relative position of the flight vehicle 100.

(a-3) Specific Example

Referring again to FIG. 3, the selection unit 171 selects the first position estimation system (for example, the system using the GPS receiver), for example. Then, the position estimation unit 179 estimates the position $p_U$ of the flight vehicle 100 from the first information (for example, the information that indicates the acceleration a) that is generated by using the inertial sensor 131 and the second information (the information that indicates the position $p_x$) that is generated through the first position estimation system. Thereafter, the selection unit 171 selects the second position estimation system (for example, the SLAM) and provides the position $p_U$ as an initial value of the position estimation by the second position estimation system to the information generation unit 175. Then, the information generation unit 175 sets the position $p_U$ as the initial value of the position estimation by the second position estimation system and generates the second information (the information that indicates the position $p_x$) through the second position estimation system. Then, the position estimation unit 179 estimates the position $p_U$ of the flight vehicle 100 from the first position (for example, the information that indicates the acceleration a) that is generated by using the inertial sensor 131 and the second information (the information that indicates the position $p_x$) that is generated by the information generation unit 175 through the second position estimation system.

(a-4) Others

If the second position estimation system is a system for estimating the absolute position of the flight vehicle 100 (for example, the system using the GPS receiver), for example, the selection unit 171 does not provide the estimated position as the initial value of the position estimation by the second position estimation system.

The selection unit 171 may provide the posture of the flight vehicle 100 that is estimated by the posture estimation unit 177 as an initial value of the posture for the position estimation by the second position estimation system in addition to the estimated position of the flight vehicle 100.

If the new position estimation system is selected as described above, for example, the initial value of the position estimation is provided for the position estimation by the new position estimation system. In this manner, it is possible to perform seamless position estimation, for example. Also, it is possible to transfer the position estimation value obtained by the system for estimating the absolute position to the system for estimating the relative position. Also, since the position estimation value obtained by the system for estimating the relative position is reset every time the selection is made, accumulation of errors can be reduced, (b) Trigger of Selection (b-1) Position Condition For example, the selection unit 171 newly selects the position estimation system from among the plurality of position estimation systems if the position of the flight vehicle 100 meets a predetermined position condition.

More specifically, the selection unit 171 newly selects the position estimation system from among the plurality of position estimation systems if the position of the flight vehicle 100 coincides with a predetermined switching position, for example. Hereinafter, specific examples will be described with reference to FIGS. 14 to 16.

First Example

Figure 14:
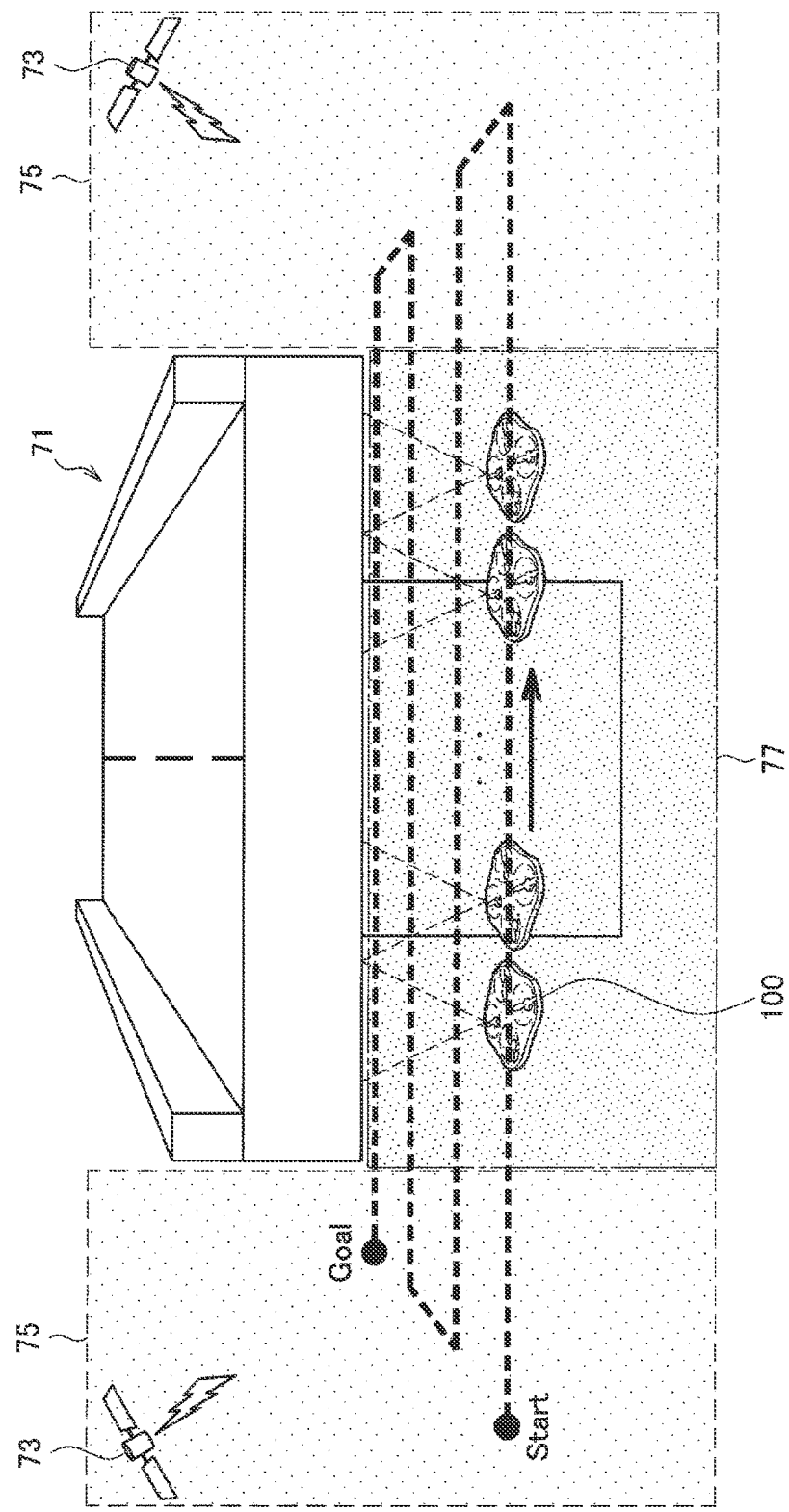
FIG. 14 is an explanatory diagram for explaining a first example of selecting (switching) the position estimation system.

FIG. 14 is an explanatory diagram for explaining a first example of selection (switching) the position estimation system. Referring to FIG. 14, a bridge 71 is illustrated. In this example, the flight vehicle 100 flies along a route from Start to Goal to image the entire rear side of the bridge 71. That is, the flight vehicle 100 reciprocates between an area 75 to which sufficient radio waves reaches from a GPS satellite 73 and an area 77 to which the radio waves from the GPS satellite 73 do not easily reach. In this case, the selection unit 171 newly selects the SLAM (for example, the stereo SLAM) as the position estimation system when the flight vehicle 100 enters the area 77 from the area 75. That is, the selection unit 171 newly selects the SLAM (for example, the stereo SLAM) as the position estimation system when the position of the flight vehicle 100 coincides with a position of a boundary between the area 75 and the area 77 (or a position near the boundary). Here, the already estimated position is transferred as an initial value of the position estimation by the SLAM. Also, the already estimated posture can also be transferred as the initial value of the posture for the position estimation by the SLAM. In contrast, the selection unit 171 newly selects the system using the GPS as the position estimation system when the flight vehicle 100 enters the area 75 from the area 77. That is, the selection unit 171 newly selects the system using the GPS as the position estimation system when the position of the flight vehicle 100 coincides with the position of the boundary between the area 77 and the area 75 (or the position near the boundary). The switching of the position estimation system (that is, the switching between the system using the GPS and the SLAM) is performed in this manner.

The position estimation system can also be selected in the same manner when the flight vehicle 100 reciprocates between an indoor space and an outdoor space.

Second Example

Figure 15:
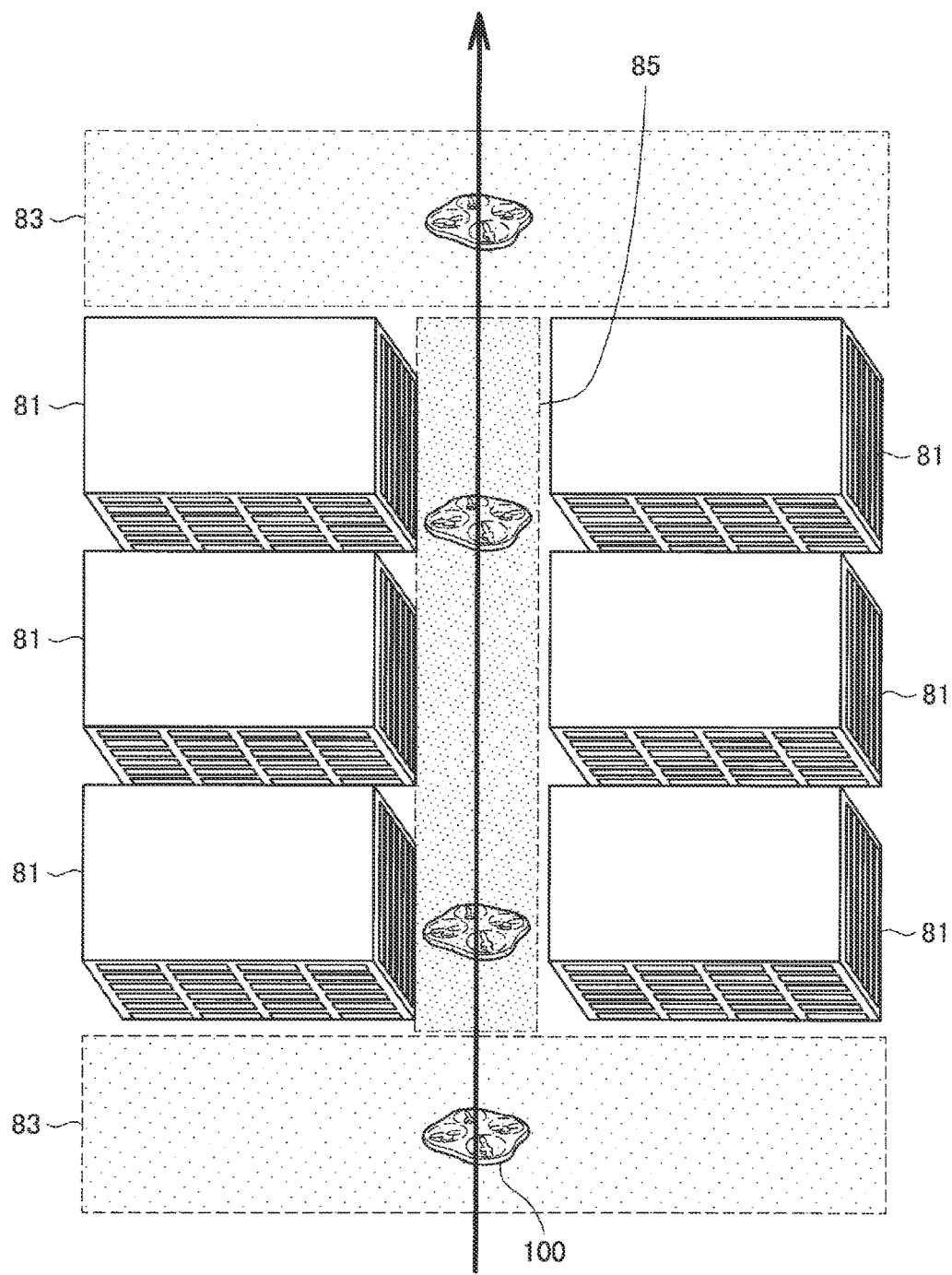
FIG. 15 is an explanatory diagram for explaining a second example of selecting (switching) the position estimation system.

FIG. 15 is an explanatory diagram for explaining a second example of selection (switching) of the position estimation system. Referring to FIG. 15, tall buildings 81 are illustrated. In this example, the flight vehicle 100 flies along a route including a path between the tall buildings 81. That is, the flight vehicle 100 flies in an area 83 to which sufficient radio waves reaches from a GPS satellite and an area 85 to which the radio waves from the GPS satellite do not easily reach (that is, an area between the tall buildings 81). In this case, the section unit 171 newly selects the SLAM (for example, the stereo SLAM) as the position estimation system when the flight vehicle 100 enters the area 85 from the area 83. That is, the selection unit 171 newly selects the SLAM (for example, the stereo SLAM) as the position estimation system when the position of the flight vehicle 100 coincides with a position of a boundary between the area 83 and the area 85 (or a position near the boundary). Here, the already estimated position is transferred as an initial value of the position estimation by the SLAM. The already estimated posture can also be transferred as an initial value of the posture for the position estimation by the SLAM. In contrast, the selection unit 171 newly selects the system using the GPS as the position estimation system when the flight vehicle 100 enters the area 83 from the area 85. That is, the selection unit 171 newly selects the system using the GPS as the position estimation system when the position of the flight vehicle 100 coincides with the position of the boundary between the area 85 and the area 83 (or the position near the boundary). The switching of the position estimation system (that is, the switching between the system using the GPS and the SLAM) is performed in this manner.

The position estimation system can also be selected in the same manner when the flight vehicle 100 flies in a valley of a mountain.

Third Example

Figure 16:
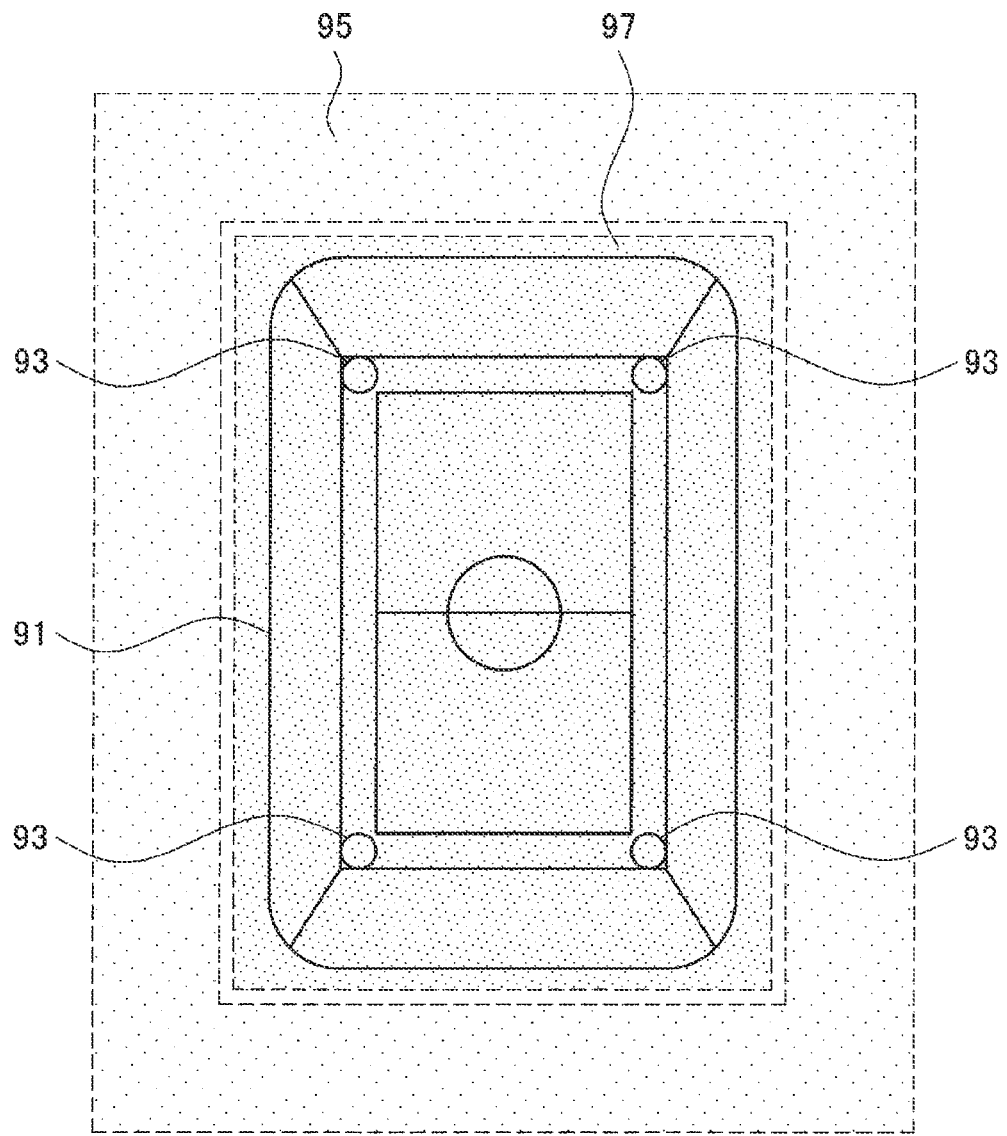
FIG. 16 is an explanatory diagram for explaining the second example of selecting (switching) the position estimation system.

FIG. 16 is an explanatory diagram for explaining a third example of selection (switching) of the position estimation system. Referring to FIG. 16, a sports ground 91 is illustrated. Markers 93 are arranged in the sports ground 91. In this example, the flight vehicle 100 flies inside and outside the sports ground 91. That is, the flight vehicle 100 flies in an area in which the markers 93 cannot be imaged and an area 97 in which the markers 93 can be imaged. In this case, the selection unit 171 newly selects the position estimation system based on the captured image of the markers as the position estimation system when the flight vehicle 100 enters the area 97 from the area 95. That is, the selection unit 171 newly selects the position estimation system based on the captured image of the markers as the position estimation system when the position of the flight vehicle 100 coincides with a position of a boundary between the area 95 and the area 97 (or a position near the boundary). Here, the already estimated position is transferred as an initial value of the position estimation based on the captured image of the markers. Also, the already estimated posture can be transferred as an initial value of the posture for the position estimation based on the captured image of the markers. In contrast, the selection unit 171 newly selects the system using the GPS as the position estimation system when the flight vehicle 100 enters the area 95 from the area 97. That is, the selection unit 171 newly selects the system using the GPS as the position estimation system when the position of the flight vehicle 100 coincides with the position of the boundary between the area 97 and the area 95 (or the position near the boundary). The switching of the position estimation system (that is, the switching between the system using the GPS and the position estimation system based on the captured image of the markers) is performed in this manner.

In addition, the position estimation system can also be selected in the same manner when the flight vehicle 100 reciprocates between an indoor space where markers are arranged and an outdoor space where no markers are arranged.

The position estimation system is newly selected when the position of the flight vehicle 100 meets the predetermined position condition as described above. In this manner, it is possible to automatically switch the position estimation system at a desired position. Therefore, it is possible to apply an appropriate position estimation system in accordance with an area where the flight vehicle 100 is located.

(b-2) Reliability of Position Estimation System

The selection unit 171 may select the position estimation system from among the plurality of position estimation systems based on a reliability that is dynamically calculated for each of the plurality of position estimation systems.

The reliability of each of the plurality of position estimation systems may be normalized (to a numerical value of 0 to 100, for example). Then, the selection unit 171 may newly select another position estimation system when the reliability calculated for the current position estimation system is lower than the reliability calculated for another position estimation system.

The reliability of the system using the GPS receiver may be calculated based on a status of capturing the GPS satellites (for example, the number of GPS satellites from which signals are received and/or the reception sensitivity of signals transmitted from the GPS satellites). The reliability of the SLAM may be calculated based on the number of feature points. The reliability of the position estimation system based on the captured image of the markers may be calculated based on a marker detection status.

In this manner, a position estimation system with higher reliability is applied, and the precision of the position estimation can be improved, for example.

For example, the position estimation system is dynamically selected from among the plurality of position estimation systems during flight of the flight vehicle 100 as described above. In this manner, the position of the flight vehicle 100 can be more favorably estimated when the flight vehicle 100 flies in various areas, for example.

(4) Combination Usage of Position Estimation Systems

The information acquisition unit 173 may acquire information that indicates two or more position estimation systems selected from among the plurality of position estimation systems. Then, the position estimation unit 179 may estimate the position of the flight vehicle 100 from first information that is generated by using the inertial sensor 131 and second information that is generated through each of the two or more position estimation systems based on a parameter for each of the two or more position estimation systems. That is, two or more position estimation systems may be used in combination.

For example, the second information that is generated through each of the two or more position estimation systems is information that indicates the position of the flight vehicle 100.

In one example, the position estimation unit 179 may calculate an average of the positions that are estimated through the two or more position estimation systems (that is, an average position). Then, the position estimation unit 179 may estimate the position of the flight vehicle 100 from the first information and the information that indicates the average (that is, the average position).

In another example, the position estimation unit 179 may multiply the position that is estimated through the position estimation systems by a weight corresponding to the position estimation system, for each of the two or more position estimation systems. Then, the position estimation unit 179 may calculate a sum of the weighted positions for the two or more position estimation systems. Then, the position estimation unit 179 may estimate the position of the flight vehicle 100 from the first information and information that indicates the sum. The weight corresponding to the position estimation system may be a reliability of the position estimation system.

In this manner, precision of the position estimation can be improved, for example.

5. FLOW OF PROCESSING

Next, an example of processing according to the embodiment of the present disclosure will be described with reference to FIGS. 17 to 19.

(1) Position Estimation Processing

Figure 17:
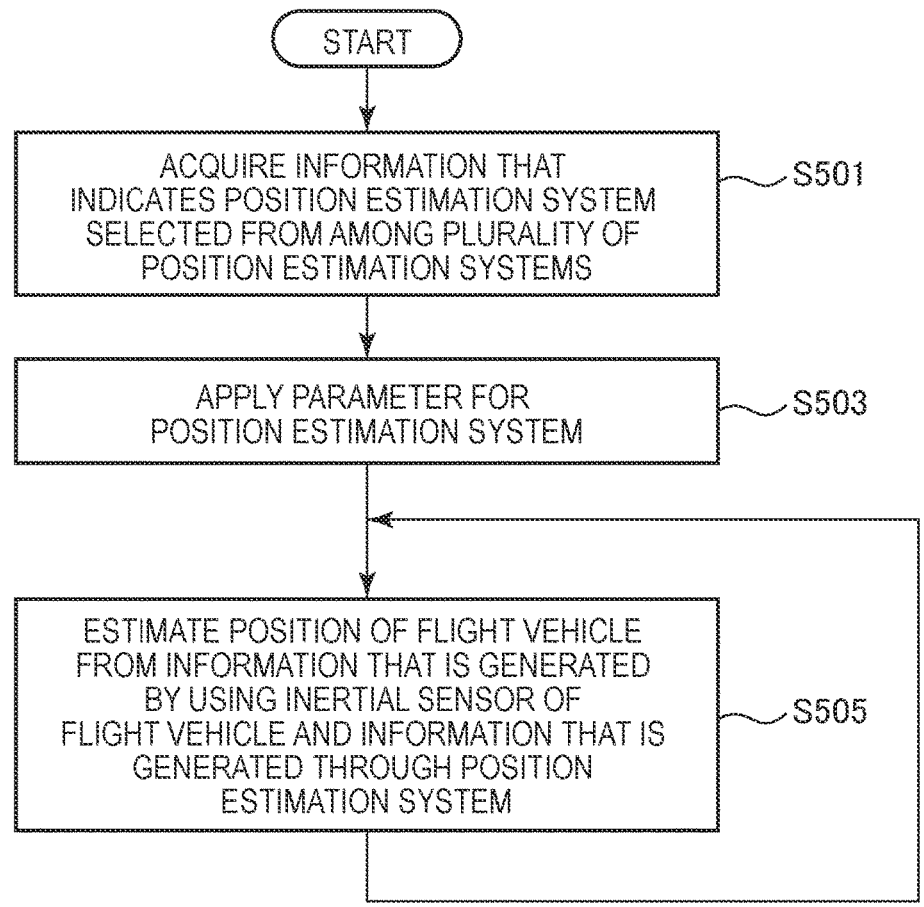
FIG. 17 is a flowchart illustrating an example of an outline flow of position estimation processing according to the embodiment.

FIG. 17 is a flowchart illustrating an example of an outline flow of position estimation processing according to the embodiment of the present disclosure.

The information acquisition unit 173 acquires information that indicates the position estimation system selected from among the plurality of position estimation systems for estimating the position of the flight vehicle 100 (S501).

The position estimation unit 179 acquires and applies a parameter for the position estimation system (S503).

The position estimation unit 179 estimates the position of the flight vehicle 100 from the first information that is generated by using the inertial sensor 131 of the flight vehicle 100 and the second information that is generated through the position estimation system (S505). Then, the processing repeats Step S505.

(2) Selection Processing

(a) First Example

Figure 18:
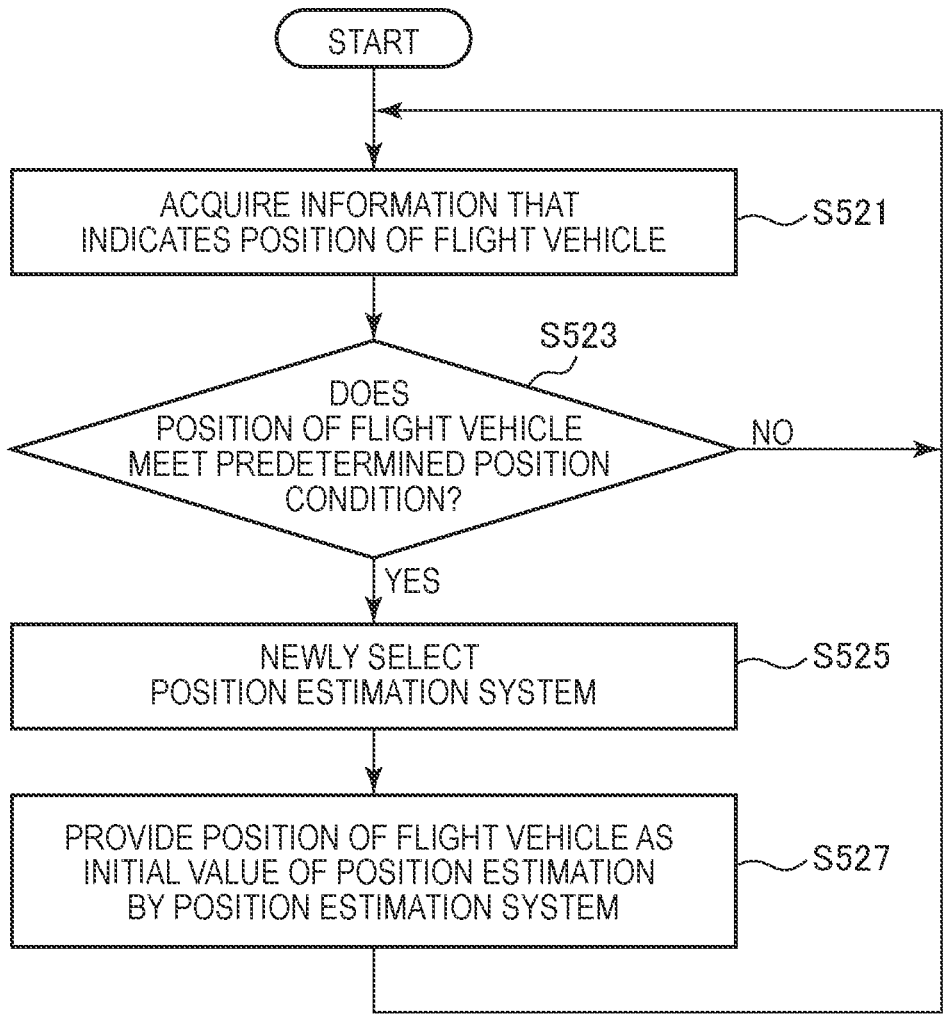
FIG. 18 is a flowchart illustrating an example of an outline flow of first selection processing according to the embodiment.

FIG. 18 is a flowchart illustrating an example of an outline flow of first selection processing according to the embodiment of the present disclosure.

The selection unit 171 acquires information that indicates the position of the flight vehicle 100 (S521). For example, the position is a position estimated by the position estimation unit 179.

If the position of the flight vehicle 100 meets the predetermined position condition (S523: YES), the selection unit 171 newly selects the position estimation system from among the plurality of position estimation systems (S525). Then, the selection unit 171 provides the position of the flight vehicle 100 (for example, the position estimated by the position estimation unit 179) as an initial value of the position estimation by the position estimation system (S527). Then, the processing returns to Step S521.

If the position of the flight vehicle 100 does not meet the predetermined position condition (S523: NO), the processing returns to Step S521.

(b) Second Example

FIG. 19 is a flowchart illustrating an example of an outline flow of second selection processing according to the embodiment of the present disclosure.

The selection unit 171 acquires information that indicates a reliability of each of the plurality of position estimation systems (S541).

If a reliability of another estimation system is higher than the reliability of the current position estimation system (S543: YES), the selection unit 171 newly selects another position estimation system (S545). Then, the selection unit 171 provides the position of the flight vehicle 100 (for example, the position estimated by the position estimation unit 179) as an initial value of the position estimation by another position estimation system (S547). Then, the processing returns to Step S541.

If the reliability of the current position estimation system is higher than the reliability of another position estimation system (S543: NO), the processing returns to Step S541.

6. CONCLUSION

The flight vehicle 100 and the respective processing according to the embodiment of the present disclosure were described hitherto with reference to FIGS. 1 to 19. According to the embodiment of the present disclosure, the flight vehicle 100 includes the information acquisition unit 173 that acquires information that indicates the position estimation system selected from among the plurality of position estimation systems for estimating the position of the flight vehicle 100 and the position estimation unit 179 that estimates the position of the flight vehicle 100 from the first information that is generated by using the inertial sensor 131 of the flight vehicle 100 and the second information that is generated through the position estimation system based on the parameter for the position estimation system. In this manner, it is possible to more favorably estimate the position of the flight vehicle 100, for example.

Also, a module for the flight vehicle 100 may include the information acquisition unit 173 and the position estimation unit 179 (and one or more other components included in the processing unit 170).

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the processing steps in the processing described herein may not necessarily be executed in a chronological manner in the orders described in the flowcharts or sequence diagrams. For example, the processing steps in the processing may be executed in an order different from those described in the flowcharts or the sequence diagrams or may be executed in parallel.

Also it is possible to produce a computer program (in other words, a computer program for causing a processor to execute the operations of the components of the device) for causing the processor (for example, a CPU or a DSP) provided in the device (for example, a flight vehicle or a module for the flight vehicle) described herein to function as the components (for example, the selection unit 171, the information acquisition unit 173, the information generation unit 175, the posture estimation unit 177, the position estimation unit 179 and/or the control unit 181) of the device. Also, a recording medium that records the computer program may be provided. Moreover, a device (for example, a flight vehicle or a module for the flight vehicle) that includes a memory that stores the computer program and one or more processors that is capable of executing the computer program may also be provided. Moreover, a method that includes the operations of the components (for example, the selection unit 171, the information acquisition unit 173, the information generation unit 175, the posture estimation unit 177, the position estimation unit 179, and/or the control unit 181) of the device is also included in the technology according to the disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A device including:

an acquisition unit that acquires information indicating a position estimation system selected from among a plurality of position estimation systems for estimating a position of a flight vehicle; and a position estimation unit that estimates the position of the flight vehicle from first information generated by using an inertial sensor of the flight vehicle and second information generated through the position estimation system based on a parameter for the position estimation system.

(2)

The device according to (1), wherein the parameter includes a parameter related to a time delay that accompanies the position estimation by the position estimation system.

(3)

The device according to (2), wherein the position estimation unit calculates a correction value from the second information based on the parameter related to the time delay and estimates the position of the flight vehicle from the first information and the correction value.

(4)

The device according to (3), wherein the position estimation unit acquires third information that indicates the position of the flight vehicle, which has already been estimated, based on the parameter related to the time delay and calculates the correction value from the second information and the third information.

(5)

The device according to any one of (1) to (4), wherein the parameter includes a parameter related to a property of noise that accompanies the position estimation by the position estimation system.

(6)

The device according to (5), wherein the position estimation unit calculates a correction value from the second information based on the parameter related to the property of the noise and estimates the position of the flight vehicle from the first information and the correction value.

(7)

The device according to (6), wherein the parameter related to the noise is a time constant of a filter that is used for calculating the correction value.

(8)

The device according to any one of (1) to (7), wherein the plurality of position estimation systems include at least one of a system using a Global Positioning System (GPS) receiver, a system using an imaging device installed on the flight vehicle, a system using an imaging device for imaging the flight vehicle, a system using a barometer, and a system using an ultrasonic sensor.

(9)

The device according to (8), wherein the system using the imaging device installed on the flight vehicle includes a system of estimating the position of the flight vehicle based on a known position at which a marker is arranged and a captured image of the marker, which has been generated by the imaging device installed on the flight vehicle.

(10)

The device according to (8) or (9), wherein the system using the imaging device installed on the flight vehicle includes simultaneous localization and mapping (SLAM) using a monocular imaging device that is installed on the flight vehicle by using a gimbal such that an optical axis coincides with an axis in an up-down direction of the flight vehicle.

(11)

The device according to any one of (1) to (10), wherein the first information includes information that indicates acceleration of the flight vehicle, and the second information is information that indicates the position of the flight vehicle.

(12)

The device according to any one of (1) to (11), further including:

a selection unit that dynamically selects a position estimation system from among the plurality of position estimation systems during flight of the flight vehicle.

(13)

The device according to (12), wherein the selection unit selects a first position estimation system from among the plurality of position estimation systems, the acquisition unit acquires information that indicates the first position estimation system, the position estimation unit estimates the position of the flight vehicle from first information generated by using the inertial sensor and second information generated through the first position estimation system based on a parameter for the first position estimation system, the selection unit selects a second position estimation system from among the plurality of position estimation systems after selecting the first position estimation system and provides the estimated position as an initial value of position estimation by the second position estimation system, the acquisition unit acquires information that indicates the second position estimation system, and the position estimation unit estimates the position of the flight vehicle from the first information generated by using the inertial sensor and second information generated through the second position estimation system based on a parameter for the second position estimation system.

(14)

The device according to (13), wherein the second position estimation system is a system for estimating a relative position of the flight vehicle.

(15)

The device according to any one of (12) to (14), wherein the selection unit newly selects a position estimation system from among the plurality of position estimation system if the position of the flight vehicle satisfies a predetermined positional condition.

(16)

The device according to any one of (12) to (15), wherein the selection unit selects a position estimation system from among the plurality of position estimation systems based on reliability that is dynamically calculated for each of the plurality of position estimation systems.

(17)

The device according to any one of (1) to (16), wherein the acquisition unit acquires information that indicates two or more position estimation systems selected from among the plurality of position estimation systems, and the position estimation unit estimates the position of the flight vehicle from the first information generated by using the inertial sensor and second information generated through each of the two or more position estimation systems based on a parameter for each of the two or more position estimation systems.

(18)

The device according to any one of (1) to (17), wherein the device is the flight vehicle or a module for the flight vehicle.

(19)

A method including:

causing a processor to acquire information that indicates a position estimation system selected from among a plurality of position estimation systems for estimating a position of a flight vehicle, and estimate the position of the flight vehicle from first information generated by using an inertial sensor of the flight vehicle and second information generated through the position estimation system based on a parameter for the position estimation system.

(20)

A program that causes a processor to acquire information that indicates a position estimation system selected from among a plurality of position estimation systems for estimating a position of a flight vehicle, and estimate the position of the flight vehicle from first information generated by using an inertial sensor of the flight vehicle and second information generated through the position estimation system based on a parameter for the position estimation system.

REFERENCE SIGNS LIST 1 system
51, 93 marker
100 flight vehicle
171 selection unit
173 information acquisition unit
179 position estimation unit
200 control device
300 piloting device
400 information processing device
410, 420 imaging device

The invention claimed is:

1. A flight vehicle, comprising:
a plurality of rotors;
a Global Positioning System (GPS) receiver configured to receive a GPS signal from a GPS satellite;
a lower side camera on a lower side of the flight vehicle, wherein an optical axis of the lower side camera is toward a vertical direction;
an ultrasonic sensor configured to emit an ultrasonic wave toward the vertical direction and receive a reflected wave of the ultrasonic wave; and
circuitry configured to:
control a flight of the flight vehicle based on the plurality of rotors, wherein
the flight corresponds to at least one of a hovering operation of the flight vehicle, a movement of the flight vehicle, and a turning operation of the flight vehicle, and
the flight is based on flight route information; and
estimate, during the flight in a flight area, a position of the flight vehicle based on at least the received GPS signal, the lower side camera, and the received reflected wave.

2. The flight vehicle according to claim 1, further comprising an inertial sensor,
wherein the circuitry is further configured to estimate, during the flight, the position and a posture of the flight vehicle based on the inertial sensor.

3. The flight vehicle according to claim 2, wherein
the circuitry is further configured to obtain a weight of a position estimation system, and
the position estimation system includes at least two of the GPS receiver, the lower side camera, the ultrasonic sensor, and the inertial sensor.

4. The flight vehicle according to claim 3, wherein the weight of the position estimation system is determined based on a status of the GPS receiver.

5. The flight vehicle according to claim 3, wherein
the position estimation system includes simultaneous localization and mapping (SLAM) based on the lower side camera, and
the weight of the position estimation system is determined based on feature points of the SLAM.

6. The flight vehicle according to claim 3, wherein the weight of the position estimation system corresponds to a reliability associated with the position estimation system.

7. The flight vehicle according to claim 2, wherein
the circuitry is further configured to estimate the position of the flight vehicle based on a time delay parameter,
the time delay parameter indicates a time delay between a position estimation system by the GPS receiver and a position estimation system by the inertial sensor.

8. The flight vehicle according to claim 2, wherein the inertial sensor includes a gyro sensor and an acceleration sensor.

9. The flight vehicle according to claim 1, wherein
the flight area includes a first area in which a sufficient GPS signal reaches from the GPS satellite and a second area in which an insufficient GPS signal reaches from the GPS satellite, and
a strength of the sufficient GPS signal is greater than a strength of the insufficient GPS signal.

10. The flight vehicle according to claim 9, wherein
the first area is in outdoor environment and the second area is in indoor environment, and
the flight vehicle is configured to reciprocate between the outdoor environment and the indoor environment.

11. The flight vehicle according to claim 1, further comprising a gimbal for the lower side camera.

12. A method, comprising:
in a flight vehicle that includes a plurality of rotors, a Global Positioning System (GPS) receiver, a lower side camera on a lower side of the flight vehicle, an ultrasonic sensor, and circuitry, wherein an optical axis of the lower side camera is toward a vertical direction:
receiving, by the GPS receiver, a GPS signal from a GPS satellite;
emitting, by the ultrasonic sensor, an ultrasonic wave toward the vertical direction and receiving a reflected wave of the ultrasonic wave;
controlling, by the circuitry, based on the plurality of rotors, a flight of the flight vehicle, wherein
the flight corresponds to at least one of a hovering of the flight vehicle, a movement of the flight vehicle, and a turning of the flight vehicle, and
the flight is based on flight route information; and
estimating, by the circuitry, during the flight in a flight area, a position of the flight vehicle based on at least the received GPS signal, the lower side camera, and the received reflected wave.

13. A non-transitory computer-readable medium having stored thereon computer-executable instructions, which when executed by a computer in a flight vehicle, cause the computer to execute operations, the operations comprising:
receiving, by a Global Positioning System (GPS) receiver of the flight vehicle, a GPS signal from a GPS satellite, wherein
the flight vehicle includes a lower side camera on a lower side of the flight vehicle, and
an optical axis of the lower side camera is toward a vertical direction;
emitting, by an ultrasonic sensor of the flight vehicle, an ultrasonic wave toward the vertical direction and receiving a reflected wave of the ultrasonic wave;
controlling, by circuitry of the flight vehicle, a flight of the flight vehicle, wherein
the flight corresponds to at least one of a hovering of the flight vehicle, a movement of the flight vehicle, and a turning of the flight vehicle, and
the flight is based on flight route information; and
estimating, by the circuitry of the flight vehicle, during the flight in a flight area, a position of the flight vehicle based on at least the received GPS signal, the lower side camera, and the received reflected wave.

* * * * *